US012772104B2

(12) United States Patent
Yamaoka

(10) Patent No.: US 12,772,104 B2
(45) Date of Patent: Oct. 20, 2026

(54) COMMUNICATION CONTROL DEVICE, COMMUNICATION CONTROL METHOD, AND NON-TRANSITORY COMPUTER READABLE MEDIUM STORING APPLICATION CONTROL PROGRAM

(71) Applicant: DENSO CORPORATION, Kariya-city (JP)

(72) Inventor: Kousuke Yamaoka, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 290 days.

(21) Appl. No.: 18/752,557

(22) Filed: Jun. 24, 2024

(65) Prior Publication Data

US 2024/0349113 A1 Oct. 17, 2024

Related U.S. Application Data

(63) Continuation of application No. PCT/JP2022/047684, filed on Dec. 23, 2022.

(30) Foreign Application Priority Data

Jan. 6, 2022 (JP) ................................ 2022-001157

(51) Int. Cl.
*H04W 24/08* (2009.01)
*H04W 28/02* (2009.01)
*H04W 28/20* (2009.01)

(52) U.S. Cl.
CPC ....... *H04W 28/0284* (2013.01); *H04W 24/08* (2013.01); *H04W 28/20* (2013.01)

(58) Field of Classification Search
CPC ....... H04W 28/20; H04W 4/44; H04W 24/08; H04W 28/0284; H04W 28/10; H04W 72/52; H04L 47/11
See application file for complete search history.

(56) References Cited

U.S. PATENT DOCUMENTS 11,134,024 B2 * 9/2021 Ogawa .............. H04L 12/40006
12,452,944 B2 * 10/2025 Yamaoka .............. H04W 24/08
2014/0022904 A1 1/2014 Ahmad et al.
2017/0150390 A1 5/2017 Ahmad et al.
(Continued)

FOREIGN PATENT DOCUMENTS

JP 2004251710 A 9/2004
JP 200688829 A 4/2006
(Continued)

*Primary Examiner* — Syed Ali
(74) *Attorney, Agent, or Firm* — Harness, Dickey & Pierce, P.L.C.

(57) ABSTRACT

Disclosed is a technique for controlling communication between a subject device and an external device. The communication is performed via a second network by an application executed by the subject device connected to a first network different from the second network. In the controlling, occurrence of congestion on a communication line used for the communication is detected by monitoring a state of the communication line. Based on the detecting the occurrence of congestion, a notification is transmitted to the application that has used the communication line on which the occurrence of congestion has been detected. The notification indicates congestion on the communication line in use.

14 Claims, 17 Drawing Sheets

(56) References Cited

U.S. PATENT DOCUMENTS

| | | | | |
|---|---|---|---|---|
| 2019/0394065 | A1* | 12/2019 | Okubo | H04L 12/28 |
| 2020/0264924 | A1* | 8/2020 | Park | G06F 9/4887 |
| 2020/0389469 | A1* | 12/2020 | Litichever | H04L 12/18 |
| 2021/0099850 | A1* | 4/2021 | Yukizaki | H04W 4/46 |
| 2021/0168825 | A1* | 6/2021 | Morioka | H04W 74/006 |
| 2021/0258982 | A1* | 8/2021 | Otaka | H04W 28/0967 |
| 2022/0330334 | A1* | 10/2022 | Tang | H04W 16/14 |
| 2023/0209588 | A1* | 6/2023 | Hoshino | G08G 1/096775<br>370/329 |
| 2023/0262826 | A1* | 8/2023 | Fujishiro | H04W 24/10<br>370/329 |
| 2023/0362595 | A1* | 11/2023 | Fujishiro | H04W 4/06 |
| 2023/0367833 | A1* | 11/2023 | Kol | G06F 16/955 |

FOREIGN PATENT DOCUMENTS

| | | | |
|---|---|---|---|
| JP | 2017163596 | A | 9/2017 |
| JP | 2018502503 | A | 1/2018 |
| JP | 201842118 | A | 3/2018 |
| WO | WO-2016111769 | A1 | 7/2016 |

* cited by examiner

FIG. 6

| ITEM | CONTENT | SET VALUE EXAMPLE |
|---|---|---|
| (A) ACCEPTABLE WAIT TIME | WHEN COMMUNICATION STARTS BY | 1d, 1h, 10min, 3s |
| (B) ACCEPTABLE RTT | ACCEPTABLE RESPONSE DELAY TIME | 10s, 1s, 100ms, 1ms |
| (C) COMMUNICATION FREQUENCY | COMMUNICATION EXECUTION FREQUENCY | 1h, 1min, 10s, 1s |
| (D) AVERAGE SIZE | ASSUMED VALUE OF DATA SIZE | 10kB, 100MB, 1GB |
| (E) MINIMUM BANDWIDTH | MINIMUM VALUE OF BANDWIDTH TO BE ENSURED | 100Kbps, 1Mbps, 10Mbps |
| (F) URGENCY | URGENT OR NOT | 1: URGENT<br>0: NOT URGENT |
| (G) CONTROL AVAILABILITY | COMMUNICATION CONTENT IS FOR IN VEHICLE CONTROL OR NOT | 1: USE<br>0: NON-USE |

FIG. 7

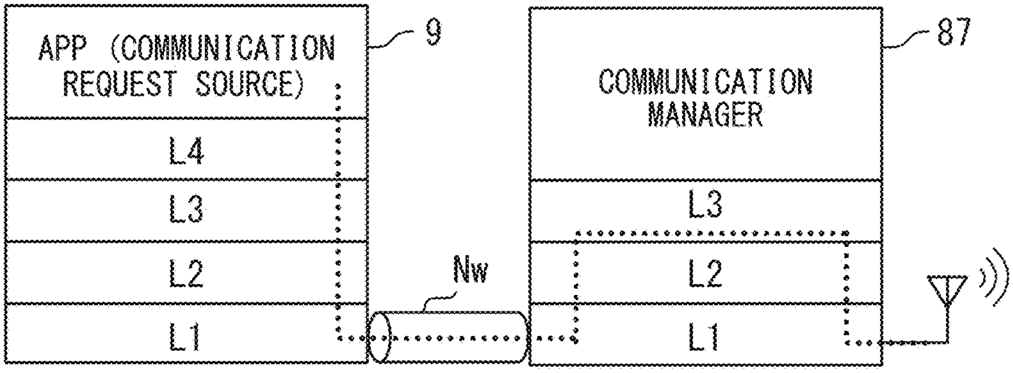

FIG. 9

| APP | PRIORITY | EXECUTION STATE | BANDWIDTH LIMITATION | COMMUNICATION FREQUENCY | DATA SIZE |
|---|---|---|---|---|---|
| App1 | 2 | ACTIVE | LIMITED | IRREGULAR | 1.5MB |
| App2 | 1 | ACTIVE | – | REGULAR (10 min) | 10MB |
| App3 | 3 | – | LIMITED | REGULAR (10 s) | 100KB |
| App4 | 4 | – | – | IRREGULAR | 100MB |
| ... | ... | ... | ... | ... | ... |

| CAUSE | CAUSE CODE |
|---|---|
| LOWER PRIORITY | 0001 |
| TRAFFIC SURGE | 0010 |
| ENVIRONMENTAL DEGRADATION | 0011 |
| INCREASE IN CHIP TEMPERATURE | 0100 |
| LINE DISCONNECTION | 0101 |
| CRITICAL SERVICE IN OPERATION | 0110 |
| 3G LINE IN USE | 0111 |
| INTERFERENCE AVOIDANCE | 1000 |
| HIGH-LOAD STATE | 1001 |
| CONT ACT UPPER LIMIT REACHED | 1010 |

| RECOMMENDED CONTROL CONTENT | RECOMMENDED CONTROL CODE |
|---|---|
| FIXED TIME WAIT | 0001 |
| WAIT FOR RESUME INSTRUCTION | 0010 |
| TIMING SHIFT | 1001 |
| RETRY INTERVAL DYNAMIC CONTROL | 1010 |
| LINE SWITCH | 1011 |
| NON-USE OF CELLULAR LINE | 1100 |

FIG. 14

| CAUSE | RECOMMENDED CONTROL CONTENT | SUPPLEMENTARY INFORMATION |
|---|---|---|
| LOWER PRIORITY | FIXED TIME WAIT | · NEXT RETRY TIMING<br>· RECOMMENDED WAIT TIME |
| TRAFFIC SURGE | | |
| ENVIRONMENTAL DEGRADATION | WAIT FOR RESUME INSTRUCTION | · PREDICTED RESUME TIME<br>· RESUME CONDITION |
| INCREASE IN CHIP TEMPERATURE | | |
| LINE DISCONNECTION | | |
| CRITICAL SERVICE IN OPERATION | | |
| 3G LINE IN USE | | |
| INTERFERENCE AVOIDANCE | | |
| HIGH-LOAD STATE | | |
| CONT ACT UPPER LIMIT REACHED | NON-USE OF CELLULAR LINE | · PREDICTED Wi-Fi CONNECTION TIME |

FIG. 15

| CAUSE | RECOMMENDED CONTROL CONTENT | SUPPLEMENTARY INFORMATION |
|---|---|---|
| LOWER PRIORITY | TIMING SHIFT | TRAFFIC PREDICTION DATA |
| TRAFFIC SURGE | TIMING SHIFT | TRAFFIC PREDICTION DATA |
| ENVIRONMENTAL DEGRADATION | RETRY INTERVAL DYNAMIC CONTROL | CURRENT STATUS DATA |
| INCREASE IN CHIP TEMPERATURE | WAIT FOR RESUME INSTRUCTION (PAUSE) | · CURRENT STATUS DATA<br>· CHIP TEMPERATURE INFORMATION<br>· PREDICTED RESUME TIME |
| LINE DISCONNECTION | LINE SWITCH | · AVAILABLE LINE INFORMATION<br>· RADIO WAVE MAP |
| CRITICAL SERVICE IN OPERATION | LINE SWITCH | · OPERATING SERVICE INFORMATION<br>· AVAILABLE LINE INFORMATION<br>· RADIO WAVE MAP |
| 3G LINE IN USE | WAIT FOR RESUME INSTRUCTION | · RADIO WAVE MAP<br>· PREDICTED 4G RETURN TIME |
| INTERFERENCE AVOIDANCE | LINE SWITCH | · AVAILABLE LINE INFORMATION |
| HIGH-LOAD STATE | WAIT FOR RESUME INSTRUCTION (PAUSE) | · LOAD STATUS DATA<br>· PREDICTED RESUME TIME |
| CONT ACT UPPER LIMIT REACHED | NON-USE OF CELLULAR LINE | · PREDICTED Wi-Fi CONNECTION TIME |

COMMUNICATION CONTROL DEVICE, COMMUNICATION CONTROL METHOD, AND NON-TRANSITORY COMPUTER READABLE MEDIUM STORING APPLICATION CONTROL PROGRAM

CROSS REFERENCE TO RELATED APPLICATIONS

The present application is a continuation application of International Patent Application No. PCT/JP2022/047684 filed on Dec. 23, 2022, which designated the U.S. and claims the benefit of priority from Japanese Patent Application No. 2022-001157 filed on Jan. 6, 2022. The disclosures of all the above applications are incorporated herein.

TECHNICAL FIELD

The present disclosure relates to a technique for relaying communication between an application used in a subject device and an external device.

BACKGROUND

Electronic control units (ECUs) provided in a vehicle perform data communication with a server disposed outside the vehicle via a communication device mounted in the same vehicle.

SUMMARY

According to at least one embodiment of the present disclosure, a technique for controlling communication between a subject device and an external device is described. The communication is performed via a second network by an application executed by the subject device connected to a first network different from the second network. In the technique, occurrence of congestion on a communication line used for the communication is detected by monitoring a state of the communication line. Based on the detecting the occurrence of congestion, a notification is transmitted to the application that has used the communication line on which the occurrence of congestion has been detected. The notification indicates congestion on the communication line in use.

BRIEF DESCRIPTION OF THE DRAWINGS

The details of one or more embodiments are set forth in the accompanying drawings and the description below. Other features and advantages will be apparent from the description and drawings, and from the claims.

FIG. 6 is a diagram illustrating an example of a communication condition.

FIG. 7 is a diagram for explaining a function of a communication manager.

FIG. 9 is a diagram for explaining an operation of a communication state management unit.

FIG. 14 is a diagram illustrating examples of recommended control content and supplementary information for each cause for limitation, which are notified to an application with its notification level set to 2.

FIG. 15 is a diagram illustrating examples of recommended control content and supplementary information for each cause for limitation, which are notified to an application with its notification level set to 3.

DETAILED DESCRIPTION

Figure 1:
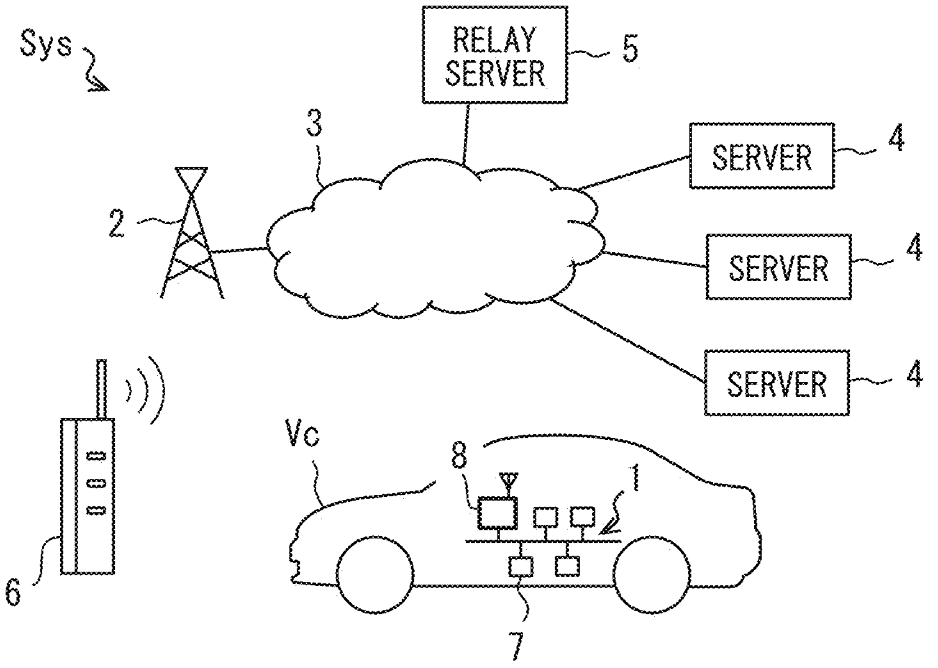
FIG. 1 is a diagram for explaining an overall image of a vehicle communication system.

A technique for relaying communication between an application used in a vehicle and a server will be described.

To begin with, examples of relevant techniques will be described.

In a comparative example, a plurality of electronic control units (ECUs) provided in a vehicle perform data communication with a server disposed outside the vehicle via a communication device mounted in the same vehicle. In addition, the communication device adjusts the order of data transmission based on a priority set in advance for each ECU in order to improve the efficiency of data transmission from the communication device to the server. Specifically, data input from an ECU with a higher priority is transmitted to the server prior to data from an ECU with a relatively low priority.

The communication control device of the comparative example adjusts the order of packet transmission for each application based on a preset priority. However, the communication control device does not use a technique for dynamically controlling allocation states of a communication line/communication bandwidth for each application.

Furthermore, there is no control mode in a case where congestion has occurred in a wireless section.

In the comparative example, when congestion occurs, it may not be possible to acquire a response from the server even in a higher-priority application. For a lower-priority application, when a response from the server is not returned, it is not possible to determine the cause, whether it is because communication with a higher-priority application has been prioritized or because congestion has occurred.

In the comparative example, the cause for communication delay in the application may be unknown, and thus, for example, retransmission requests (so-called retries) in a transmission control protocol (TCP) layer/application layer may occur frequently. Frequent retransmission requests may lead to an increase in the processing load of the communication control device. In addition, the processing load of the application itself may increase due to retry processing.

In contrast, the present disclosure can provide a communication control device, a communication control method, and an application control program that enable an application to recognize occurrence of congestion.

According to an aspect of the present disclosure, a communication control device includes a communication controller configured to carry out controlling communication between a subject device and an external device. The communication is performed via a second network by an application executed by the subject device connected to a first network different from the second network. The controlling includes detecting occurrence of congestion on a communication line used for the communication by monitoring a state of the communication line, and transmitting, based on the detecting the occurrence of congestion, a notification to the application that has used the communication line on which the occurrence of congestion has been detected, the notification indicating congestion on the communication line in use.

With the above configuration, the application can understand the occurrence of congestion.

According to another aspect of the present disclosure, a communication control method is performed by a communication control device for controlling communication between a subject device and an external device. The communication is performed via a second network by an application executed by the subject device connected to a first network different from the second network. The communication control method includes detecting occurrence of congestion on a communication line used for the communication by monitoring a state of the communication line, and transmitting, based on the detecting the occurrence of congestion, a notification to the application that has used the communication line on which the occurrence of congestion has been detected, the notification indicating congestion on the communication line in use.

According to the above method, the same effects as those of the communication control device can be obtained.

According to another aspect of the present disclosure, a non-transitory computer readable medium stores an application control program that includes instructions for a subject device executing an application for performing data communication with an external device. The instructions is configured to, when executed by at least one processor, cause the subject device to carry out receiving a message from a communication control device configured to control communication between the application and the external device. The message indicates that congestion has occurred on a communication line used for the communication with the application. The instructions is further configured to, when executed by at least one processor, cause the subject device to carry out limiting the communication based on the receiving of the message indicating that congestion has occurred on the communication line.

According to the control program, communication with an external device is limited based on the notification that congestion has occurred.

Hereinafter, embodiments of the present disclosure will be described with reference to the drawings. FIG. 1 is a diagram illustrating an example of a schematic configuration of a vehicle communication system Sys according to the present disclosure. The vehicle communication system Sys performs wireless communication conforming to the fourth generation/long-term evolution (4G/LTE). The parts omitted in the description of the embodiment are performed by methods specified in the 4G/LTE standard. Note that the vehicle communication system Sys may provide wireless communication conforming to the third generation (3G) standard, the fifth generation (5G) standard, the sixth generation (6G) standard, or the like. Hereinafter, 3G, 4G/LTE, 5G, 6G, and the like are also collectively referred to as 4G and the like.

An overall configuration will be described. As illustrated in FIG. 1, the vehicle communication system Sys includes an in-vehicle system 1, a cellular base station 2, a wide-area communication network 3, a server 4, and a relay server 5. In addition, the vehicle communication system Sys can include a Wi-Fi (registered trademark) base station 6 as an optional element. Although FIG. 1 illustrates only one cellular base station 2 and one Wi-Fi base station 6, there can be a plurality of cellular base stations 2 and Wi-Fi base stations 6. Although FIG. 1 also illustrates only one vehicle Vc in which the in-vehicle system 1 is mounted, there can be a plurality of such vehicles Vc as the whole system.

As will be described in detail later, the in-vehicle system 1 includes a plurality of electronic control units (ECUs) 7 and a wireless communication device 8. The ECU 7 is a control device mounted in the vehicle Vc. Furthermore, the in-vehicle system 1 includes a plurality of applications (hereinafter, applications 9). The application 9 is a program that operates on the ECU 7. The term "application" may be abbreviated as "app".

The wireless communication device 8 is a device (communication controller) used in the vehicle as an interface for the application 9 to perform data communication with the server 4 as an external device. The wireless communication device 8 controls communication between the application 9 and the server 4. The wireless communication device 8 corresponds to a communication control device. The wireless communication device 8 is configured to be able to use a plurality of types of wireless communication services (in other words, communication lines) with different communication methods, such as a cellular line and a Wi-Fi line. The cellular line here refers to a communication line via the cellular base station 2, in other words, a communication line conforming to 4G or the like. The Wi-Fi line refers to a communication line passing through the Wi-Fi base station 6. The Wi-Fi line is available when the vehicle Vc is present within the communication area of the Wi-Fi base station 6.

The application 9 communicates with the server 4 to provide a predetermined service to the user of the vehicle Vc. The application 9 is implemented by an arithmetic core, included in the ECU 7, executing predetermined application software. The application 9 can include an application control program. The term "application" and "app" in the present disclosure can be read as a device/arithmetic core that executes an application. The arithmetic core refers to a processor such as a central processing unit (CPU).

The cellular base station 2 is a facility that transmits and receives wireless signals conforming to standards such as 4G to and from the wireless communication device 8. The cellular base station 2 is also referred to as an Evolved Node B (eNB). The cellular base station 2 may be a Next Generation Node B (gNB) used in 5G. The cellular base station 2 exchanges control signals with the wireless communication device 8, thereby realizing connection to the wide-area communication network 3 by the wireless communication device 8, and eventually, data communication between the wireless communication device 8 and various servers 4.

The cellular base station 2 transmits various reference signals (RSs) as needed. Examples of the reference signal include a cell-specific RS (CRS) and a CSI-Reference Signal (CSI-RS). CSI is an abbreviation of channel state information. The CRS is a control signal for cell selection. The CSI-RS is an RS for estimating the state of a transmission path in the uplink or downlink direction. In one aspect, the various RSs correspond to control signals for the wireless communication device 8 to evaluate so-called quality of service (QOS), such as a communication speed, a latency, and a packet loss rate of a communication line.

The wide-area communication network 3 includes a core network such as an evolved packet core (EPC). The wide-area communication network 3 can also include the Internet or an Internet Protocol (IP) network other than the Internet. The wide-area communication network 3 may be any network to which the server 4, the relay server 5, and the Wi-Fi base station 6 are connected. The wide-area communication network 3 corresponds to a second network.

In the present disclosure, communication facilities constituting the wide-area communication network 3, such as a mobility management entity (MME) and a serving gateway (S-GW), are collectively referred to as network-side equipment. The network-side equipment can include the cellular base station 2. Note that the MME is a facility in charge of managing user equipment (UE) in a cell and controlling the cellular base station 2.

The server 4 is a computer that executes processing to provide a predetermined service by executing data communication with the application 9. Data communication between the server 4 and the application 9 is performed via the relay server 5. The server 4 executes predetermined processing on data received from the application 9 used in the vehicle Vc. The server 4 transmits data according to the provided service to the application 9 and collects data from the application 9. The server 4 can be present for each application 9. The server 4 corresponds to an external device.

The relay server 5 is a server that relays communication between the vehicle Vc and the server 4. The relay server 5 integrally controls communication connection between the vehicle Vc and the server 4 and monitors the communication state When the wireless communication device 8 is connected to the wide-area communication network 3, the relay server 5 can communicate with the wireless communication device 8 via the wide-area communication network 3. The relay server 5 transmits data to the ECU 7 mounted in the designated vehicle Vc or acquires data from the vehicle Vc based on a request from the server 4.

The Wi-Fi base station 6 is a communication facility for forming a wireless local area network (LAN) conforming to Wi-Fi. Various standards such as IEEE802.11n, IEEE802.11ac, and IEEE802.11ax (so-called Wi-Fi 6) can be adopted as the Wi-Fi standard. The Wi-Fi base stations 6 are disposed at optional places by various service providers as infrastructure facilities. Note that Wi-Fi in the present disclosure refers to Wi-Fi that can be used by the wireless communication device 8, such as free Wi-Fi or Wi-Fi subscribed by the user or vehicle manufacturer. The Wi-Fi base station 6 can be referred to as an access point or a router.

Note that the specification of the mounted ECU 7 can differ for each vehicle Vc. The specification of the ECU can include an operating system (OS), the startup states of the ECU 7/application 9 when the traveling power source is turned off, and the like. The traveling power source is a power source for the vehicle Vc to travel and refers to an ignition power source when the vehicle Vc is a gasoline vehicle. When the vehicle Vc is an electric vehicle, the traveling power source refers to a system main relay. Examples of the electric vehicle include an electric automobile, a hybrid vehicle, and a fuel cell vehicle.

Examples of the applications 9 provided in the vehicle will be described. Various applications 9 can be mounted in the vehicle Vc. For example, the vehicle Vc includes some or all of a vehicle state check application, an automated valet parking (AVP) application, an emergency call application, a control support application, and the like. Note that the application 9 exemplified here is an example, and various applications can be used in the vehicle Vc in addition to those exemplified.

The vehicle state check application is an application for the user to check the state of the vehicle Vc such as total travel distance, remaining battery level, the open/close state of each door, and indoor temperature using a user device. The user device refers to a smartphone, a tablet terminal, a laptop, a desktop personal computer (PC), or the like. The vehicle state check application periodically uploads various types of information to the server 4. The server 4 corresponding to the vehicle state check application stores the data of the vehicle state acquired from the application, and transmits the data to a predetermined user device based on a request from the user.

Note that the vehicle state check application may be in-vehicle software for displaying a video from the in-vehicle camera on the user device through the server 4 or storing the video in the server 4. The vehicle state check application may be equipped with a function to control the door lock/unlock state, the degree of window opening, and the lighting state of a lighting device, based on instruction signals transmitted by the user through the server 4. That is, the vehicle state check application may be configured as an application for remotely controlling the body electrical equipment and air conditioner of the vehicle Vc. The body electrical equipment includes various lighting devices, a door lock motor, a window motor, and the like.

The AVP application is an application that provides automatic parking service or automatic exit service. The automatic parking service refers to causing the vehicle Vc to automatically travel to a vacant parking space and park the vehicle. The automatic exit service refers to a service in which a parked vehicle Vc is activated and travels automatically to the user. Based on a request from the application 9, the server 4 corresponding to the AVP application can transmit target parking position information such as a vacant space available for parking. Furthermore, based on an exit request from the user device, the server 4 corresponding to the AVP application transmits the current position of the user and the like to the AVP application.

The emergency call application is an application that notifies a predetermined center or user device of the occurrence of abnormality, using an accident, an abnormality of an occupant, or the like as a trigger. The emergency call application may be an application that detects an abnormality related to theft, such as unauthorized unlocking of the vehicle Vc, and notifies the center or the like of the abnormality. The emergency call application corresponds to an application of relatively high importance.

The control support application is an application that receives control support information, which is information that serves as a reference for creating a control plan, from the server 4 periodically or when a predetermined event occurs. The control support information is information on a semi-dynamic map element indicating the position and type of an obstacle on traveling, such as the tail end of traffic congestion or the position of an on-road dropped object. The control support information may be information indicating the position and lighting state of a traffic light present in front of the vehicle Vc, or information indicating a traveling track according to a traveling direction inside and outside an intersection. Based on a request from the application, the server 4 corresponding to the control support application can distribute the control support information according to the current position of the vehicle Vc.

As described above, the relay server 5 is a server that relays communication between the vehicle Vc and the server 4, and eventually, communication between the application 9 and the server 4. The relay server 5 corresponds to a computer that provides main functions on the cloud side in an automotive communication platform (ACP), which is a wireless platform. The ACP is a technology for enabling secure data communication between the server 4 and the application 9 while concealing (abstracting) a difference in a system configuration for each vehicle Vc.

For example, due to differences in model, release year (generation), grade, and the like, a combination of an ECU that is turned off and an ECU that is not turned off during parking can differ for each vehicle Vc. In addition, the configuration of the in-vehicle system 1 itself, including the ECUs, can differ for each vehicle Vc. The relay server 5 conceals, from the server 4 side, a difference in system configuration for each vehicle Vc and a difference in power state for each ECU, that is, diversity for each vehicle Vc and for each ECU 7. Then, the relay server 5 realizes pseudo continuous connection, making it appear as though each ECU 7 and the server 4 are always connected. The relay server 5 is a server constituting the ACP in one aspect, and thus can also be referred to as an ACP server.

Figure 2:
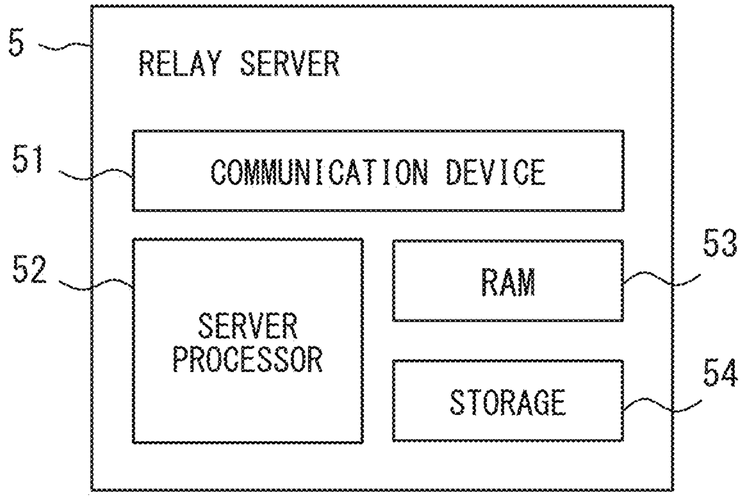
FIG. 2 is a block diagram illustrating a configuration of a relay server.

As illustrated in FIG. 2, such a relay server 5 includes a communication device 51, a server processor 52, a random-access memory (RAM) 53, and a storage 54. The communication device 51 is a configuration for performing communication with the wireless communication device 8 and various servers 4. The communication device 51 may be configured to be able to perform encrypted communication using transport layer security (TLS) with another device such as the server 4. The server processor 52 is an arithmetic core such as a CPU. The RAM 53 is a rewritable volatile memory. The storage 54 is a rewritable nonvolatile memory. The storage 54 stores a relay server program that is a program for relaying data communication between the wireless communication device 8 and the server 4. The relay server program can also be referred to as ACP cloud software.

The server processor 52 acquires communication route information (so-called 5-tuple) such as address information and port numbers of various devices by exchanging control signals with the wireless communication device 8 and the server 4. The address information may be one or both of an IP address and a media access control (MAC) address.

The relay server 5 notifies the server 4 of information necessary for communication with the application 9 as needed. The information necessary for communication with the application 9 is, for example, communication route information allocated to the application 9. The relay server 5 also notifies the wireless communication device 8 of information necessary for communication with the server 4. The relay server 5 relays the concealed/encrypted data communication between the application 9 and the server 4 using the communication route information.

Note that the relay server 5 may be implemented using a plurality of computers. Some or all of the functions provided by the relay server 5 may be included in each server 4. The relay server 5 may be integrated with the server 4. In addition, the relay server 5 may be an optional element and may be omitted. That is, the vehicle Vc and the server 4 may be configured to perform data communication without the relay server 5.

Figure 3:
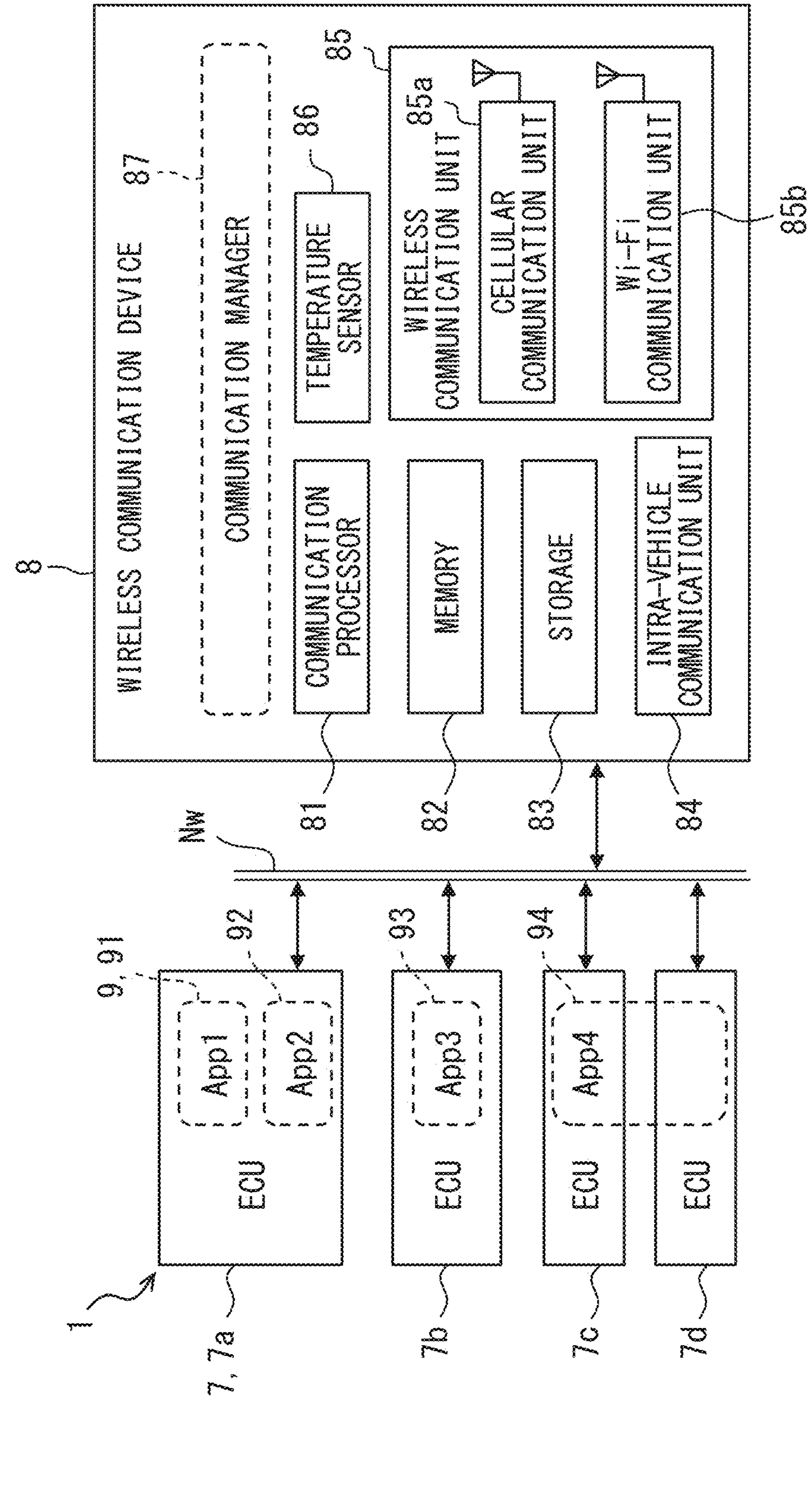
FIG. 3 is a block diagram illustrating a configuration of an in-vehicle system.

As illustrated in FIG. 3, each of the plurality of ECUs 7 (subject device) included in the in-vehicle system 1 is connected to the wireless communication device 8 via an in-vehicle network Nw. The in-vehicle network Nw is a communication network constructed in the vehicle. The in-vehicle network Nw may be an optional standard such as a controller area network (CAN, registered trademark) or Ethernet (registered trademark). The in-vehicle network Nw corresponds to a first network. Note that some ECUs 7 may be directly connected to the wireless communication device 8 without via the in-vehicle network Nw. In addition, another ECU 7 may be interposed between a certain ECU 7 and the wireless communication device 8.

The example illustrated in FIG. 3 illustrates a case where four ECUs 7*a* to 7*d* are connected to the wireless communication device 8 as the ECU 7. The number of ECUs 7 connected to the wireless communication device 8 can be changed as appropriate. Only one ECU 7 may be connected to the wireless communication device 8. The plurality of ECUs 7 differ in service/control target and the like.

Figure 4:
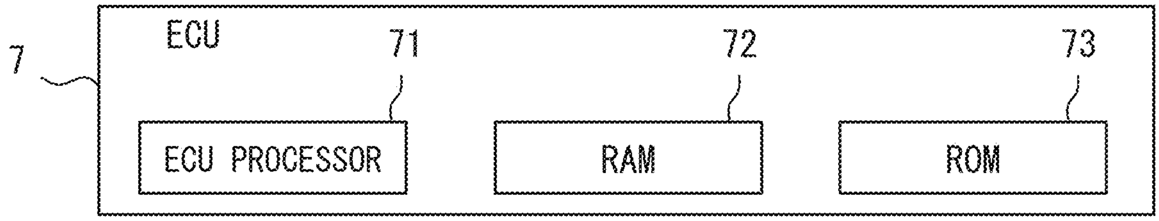
FIG. 4 is a block diagram illustrating a configuration of an ECU.

As illustrated in FIG. 4, each ECU 7 may be a computer including an ECU processor 71, a RAM72, a read-only memory (ROM) 73, and the like. The ECU processor 71 is an arithmetic core such as a CPU. Each ECU 7 executes a program stored in the ROM73 to execute processing according to the program. An ECU-ID, which is unique identification information, is allocated to each ECU 7.

The ECU 7 is configured to be able to execute one or a plurality of applications 9. Note that the plurality of ECUs 7 may be configured to execute one application 9 in cooperation with each other. A first application 91 illustrated in FIG. 3 is the application 9 executed by the ECU 7*a*, and a second application 92 and a third application 93 are the applications 9 executed by the ECU 7*b*. The fourth application 94 is an application 9 implemented by the cooperation of the ECUs 7*c*, 7*d*.

Note that "App" in the figure is an abbreviation for application. In addition, "AppN" in the figure means an Nth application. For example, "App1" refers to the first application 91, and "App2" refers to the second application 92. The applications 9 may be various applications such as the AVP application described above. The plurality of applications 9 provide different services/functions.

An application ID, which is unique identification information, is allocated to each application 9. The application ID may be allocated by the designer/distributor of the application 9, or may be allocated by a predetermined ECU 7 that comprehensively manages installation and the like of software in the vehicle Vc during installation in the vehicle Vc (actually, the ECU 7).

The operation of the application 9 will be described. The application 9 outputs transmission data, which is addressed to the server 4 corresponding to the application 9, to the wireless communication device 8. Furthermore, the application 9 acquires data from the server 4 from the wireless communication device 8. Each application 9 outputs a communication start request to the wireless communication device 8 as transmission data to the server 4 or the like. The communication start request corresponds to a predetermined electrical signal, message, or communication frame that requests the start of data communication. The communication start request includes an application ID. In addition, the communication start request can include a communication condition indicating a condition related to data communication with the server 4.

Figure 5:
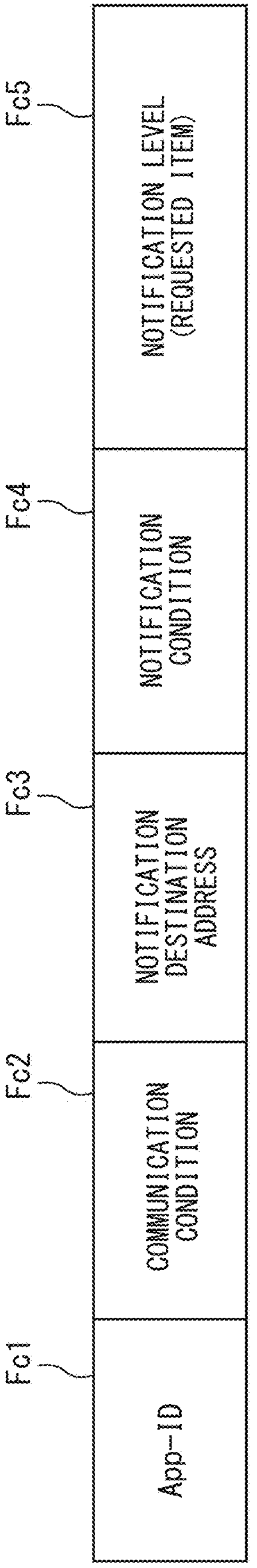
FIG. 5 is a diagram illustrating an example of a frame configuration of a communication start request.

As illustrated in FIG. 5, the communication start request can include an application ID, a communication condition, a notification destination address, a notification condition, and a notification level. Fc1 in the drawing indicates an application ID field that is an area in which the application ID is placed in the communication frame. Fc2 indicates a communication condition field that is an area in which the communication condition is placed in the communication frame. Fc3 indicates a notification destination address field that is an area in which the notification destination address is placed in the communication frame. Fc4 indicates a notification condition field that is an area in which the notification condition is placed in the communication frame. Fc5 indicates a notification level field that is an area in which the notification level is placed in the communication frame.

As illustrated in FIG. 6, items constituting the communication condition include: (A) acceptable waiting time, (B) acceptable RTT, (C) communication frequency, (D) average size, (E) minimum bandwidth, (F) urgency, and (G) control availability.

(A) The acceptable waiting time indicates when communication needs to start by, in other words, the waiting time until the start of communication that is acceptable for the application 9. Note that "d", "h", "min", "s", and "ms" illustrated in the columns of the set value example in FIG. 6 indicate units of time such as "day", "hour", "minute", "second", and "millisecond" in this order. (B) The acceptable RTT indicates an acceptable response delay time. RTT stands for round-trip time.

(C) The communication frequency indicates an execution frequency of data transmission/reception. (D) The average size indicates an assumed value of the size of one data set exchanged between the application 9 and the server 4. (E) The minimum bandwidth indicates the minimum value of a communication bandwidth to be ensured. The minimum bandwidth can be expressed by a concept of a communication speed such as 10 Mbps or 1 Mbps. The minimum bandwidth may be calculated and set by the wireless communication device 8 based on the communication frequency, average size, and the like.

(F) The urgency indicates whether the communication is highly urgent, in other words, whether the communication is to be started immediately. The urgency may be expressed by a flag. When the urgency flag is 1 (on), this indicates that the communication is highly urgent, and when the urgency flag is 0 (off), this indicates that the communication is less urgent. The application 9, for which the urgency flag is set to "on", is an emergency call application, an application for uploading accident data to the server 4, a theft detection application, or the like. The degree of urgency may be determined by the wireless communication device 8 based on the acceptable waiting time described above.

(G) The control availability indicates whether data exchanged with the server 4 is data used for travel control of the vehicle Vc. The control availability may be expressed by a flag. When the control availability flag is 1 (on), this indicates that the communication handles data used in vehicle control, and when the control availability flag is 0 (off), this indicates that the communication handles data not related to or less related to vehicle control. Urgency and control availability both indicate importance, that is, whether the communication is important. The items of urgency and control availability may be integrated into a parameter such as importance.

Note that the communication condition transmitted from the application 9 to the wireless communication device 8 does not need to include all the above items. The above item group is an example, and a specific combination of items of the communication condition can be changed as appropriate. In addition to the above, the communication condition may include a flag indicating whether active use the Wi-Fi line is requested.

In the present embodiment, as an example, the communication condition for each application 9 is transmitted to the wireless communication device 8 in a form included in the communication start request, but the notification mode of the communication condition is not limited thereto. The application 9 may voluntarily transmit a message indicating the communication condition separately from the communication start request. The application 9 may transmit a message indicating the communication condition, based on a request from the wireless communication device 8. In addition, the application 9 may transmit the communication condition to the wireless communication device 8 at the timing when the ECU 7 and the wireless communication device 8 are communicably connected with each other as the traveling power source is turned on. The application 9 may transmit the communication condition and the like to the wireless communication device 8 every time communication traffic (in other words, transmission data) for the server 4 is generated. In addition, the communication condition may be described in a header or the like of data transmitted from each application 9 to the wireless communication device 8.

The notification destination address stored in the notification destination address field Fc3 is information for the wireless communication device 8 to specify a destination of a communication status notification to be described later. The communication status notification includes data indicating the current status of communication, such as a line in use by the application 9 being congested or bandwidth being limited, and the cause for the status. Furthermore, the communication status notification can include recommended control content, control determination materials, and the like as additional information (in other words, reference information). Details of the communication status notification will be separately described later.

The notification destination address may be the communication address of the ECU 7 in the in-vehicle network Nw. When the wireless communication device 8 can specify the transmission destination of the communication status notification based on the application ID, the notification destination address field Fc3 may be omitted.

The notification condition field Fc4 stores a code specifying a notification condition that is a condition for causing the wireless communication device 8 to transmit a communication status notification. The notification condition may be a case where congestion is predicted within a predetermined time, a case where light congestion occurs, a case where severe congestion occurs, a case where the line in use becomes unavailable, or other cases. The cause for congestion/bandwidth limitation and the like can also be adopted as elements constituting the transmission condition. Note that severe congestion in the present disclosure is a state where the delay time is equal to or greater than a predetermined first threshold (for example, 10 seconds). The severe congestion state can include a state where communication is substantially impossible or a state where communication connection is blocked. The light congestion is a state where the delay time is equal to or greater than a second threshold (for example, 5 seconds) and less than the first threshold. The second threshold can be set to a value smaller than the first threshold by a predetermined amount.

In the notification level field Fc5, a code for designating the fineness/amount of information that the application 9 requires to be notified of from the wireless communication device 8 is stored as the communication status notification. The fineness/amount of reference information may be expressed in three stages of level 1 to 3. A larger level value indicates that provision of more/finer information is requested. Level 1 has the smallest amount of information.

Level 1 is a level at which the following notification is requested: the fact of the communication status such as whether congestion has occurred, and the cause thereof. Level 2 is a level at which notification (suggestion) of recommended control content is requested in addition to the communication status and the cause therefor. The level 3 is a level at which notification of control determination material is requested in addition to the communication status, the cause therefor, and the recommended control content. In the present disclosure, a level indicating a type or the like of an item that the application 9 requests to be notified of is referred to as a notification level. In other words, the notification level corresponds to a parameter that defines an item to be notified to the application 9 by the wireless communication device 8. The notification level field Fc5 may be a field in which a code is placed to indicate an item requested to be notified (in other words, a requested item). As the notification level, level 0 may be prepared at which the application 9 does not request the transmission of the communication status notification or the wireless communication device 8 does not transmit the communication status notification.

The wireless communication device 8 is configured to be able to use at least one cellular line by including at least one subscriber identity module (hereinafter SIM). The SIM is an IC module in which information for identifying a contractor of a line is recorded, and is configured as an IC card. By mounting the SIM, the wireless communication device 8 is configured to be able to perform data communication using at least one access point name (APN) corresponding to the SIM. The APN corresponding to the SIM refers to an APN that is available based on information on the SIM. As an example, the wireless communication device 8 of the present embodiment is configured to be able to use two cellular lines with different APNs. Hereinafter, two cellular lines that can be used by the wireless communication device 8 using the SIM are referred to as a first line and a second line.

In addition, the wireless communication device 8 is configured to be able to perform Wi-Fi communication, and uses different communication lines depending on the generation status of communication traffic in each ECU 7. That is, the wireless communication device 8 selectively uses various communication lines based on the use of communication and the communication status. The concept of the communication line/communication route that can be used by the wireless communication device 8 includes a Wi-Fi line as well as a cellular line.

A communication device ID as unique identification information is allocated to the wireless communication device 8. The communication device ID functions as information for the relay server 5 and the server 4 to identify each of a plurality of wireless communication devices 8 (vehicles Vc). The wireless communication device 8 may be accommodated in an instrument panel. Note that the wireless communication device 8 may be a device configured to be detachable from the vehicle Vc by the user. Furthermore, the wireless communication device 8 may be a mobile terminal such as a smartphone brought into the vehicle compartment by the user.

The wireless communication device 8 is mainly composed of a computer including a communication processor 81, a RAM 82, a storage 83, an intra-vehicle communication unit 84, a bus that connects these units, and the like. In addition, the wireless communication device 8 includes a wireless communication unit 85 and a temperature sensor 86. The wireless communication unit 85 includes a cellular communication unit 85*a* and a Wi-Fi communication unit 85*b*.

The communication processor 81 is hardware for arithmetic processing coupled with the RAM 82. The communication processor 81 includes at least one arithmetic core such as a CPU. The communication processor 81 executes various processing by accessing the RAM 82. The wireless communication device 8, which includes the communication processor 81, corresponds to a host device from the perspective of the communication processor 81.

The storage 83 is a device including a nonvolatile storage medium such as a flash memory. The storage 83 stores a communication control program as a program executed by the communication processor 81. The communication processor 81 executing the program corresponds to the communication processor 81 executing a communication control method that corresponds to the communication control program. Information (for example, a profile) about an APN available to the wireless communication device 8 is registered in the storage 83. Furthermore, a service set identifier (SSID), an encryption key, and the like of Wi-Fi available to the wireless communication device 8 are registered in the storage 83.

In addition, a radio wave map is stored in the storage 83. The radio wave map is data indicating radio wave intensity at each location/predetermined section on the road. The radio wave map may be data indicating an uplink/downlink throughput, a round-trip latency, and the like for each location. The radio wave map may be data indicating channel state information (CSI) for each location. The radio wave map can be distributed from the relay server 5 or the cellular base station 2. The radio wave map can be dynamically updated. The storage destination of the radio wave map in the wireless communication device 8 may be a volatile memory such as the RAM 82.

The communication processor 81 operates as a communication manager 87 that controls the operations of the intra-vehicle communication unit 84 and the wireless communication unit 85 by executing the communication control program installed in the storage 83. The communication manager 87 executes processing as a part or all of an application layer and a transport layer. Details of the communication manager 87 will be separately described later.

The intra-vehicle communication unit 84 is a circuit module for communicating with the ECU 7 via the in-vehicle network Nw. The intra-vehicle communication unit 84 receives the transmission data output by each ECU 7 and outputs the transmission data to the communication manager 87. Furthermore, the intra-vehicle communication unit 84 outputs data input from the communication processor 81 to the ECU 7 designated as the destination. The intra-vehicle communication unit 84 acquires the original data by separating the multiplexed data input from each ECU 7 by a predetermined method. Such an intra-vehicle communication unit 84 is implemented using an analog circuit element, an IC, a physical layer (PHY) chip conforming to the communication standard of the in-vehicle network Nw, or the like. In addition to the transmission data input from the ECU 7, various types of data, such as vehicle speed data detected by a vehicle speed sensor, are input to the intra-vehicle communication unit 84. The transmission data here corresponds to communication traffic (in other words, data) for the server 4.

The cellular communication unit 85*a* is a communication module in charge of a data link layer and a physical layer in a wireless communication protocol such as 4G. The cellular communication unit 85*a* includes an antenna capable of transmitting and receiving a radio wave in a frequency band used in LTE. Furthermore, the cellular communication unit 85*a* includes a transceiver that performs signal processing corresponding to conversion of a baseband signal into a high-frequency signal and vice versa, and a packet processing unit that performs conversion between an IP packet and a physical channel signal.

The cellular communication unit 85*a* performs the IP packet input from the intra-vehicle communication unit 84 or the communication manager 87 at each of data link sublayers of PDCP, RLC, and MAC. In addition, a carrier wave signal corresponding to input data is generated by performing processes such as encoding, modulation, and digital-to-analog conversion. Then, the generated carrier wave signal is output to the antenna to be radiated as a radio wave. PDCP stands for packet data convergence protocol, RLC stands for radio link control, and MAC stands for media access control. In addition, the cellular communication unit 85*a* performs predetermined processes, such as an analog-to-digital conversion process and a demodulation process, on a received signal received by the antenna to convert the received signal into an information sequence represented by digital values (that is, digital data). Then, data corresponding to the received signal is output to the communication manager 87 or the intra-vehicle communication unit 84.

The Wi-Fi communication unit 85*b* is a communication module for connecting to the wide-area communication network 3 via the Wi-Fi base station 6. The Wi-Fi communication unit 85*b* is configured using an antenna, a modulation circuit, a demodulation circuit, and the like for transmitting and receiving a radio wave in a frequency band used in the Wi-Fi standard, such as a 2.4 GHz band and a 5 GHz band. The Wi-Fi communication unit 85*b* emits a wireless signal corresponding to the data input from the intra-vehicle communication unit 84 or the communication manager 87. Furthermore, the Wi-Fi communication unit 85*b* outputs data corresponding to a received signal received by the antenna to the intra-vehicle communication unit 84 or the communication manager 87.

Note that the Wi-Fi communication unit 85*b* recognizes the presence of the Wi-Fi base station 6 by receiving a beacon emitted from the Wi-Fi base station 6. The communication connection between the Wi-Fi communication unit 85*b* and the Wi-Fi base station 6 is controlled by the communication manager 87. Furthermore, the operation state and the power state of the Wi-Fi communication unit 85*b* are controlled by the communication manager 87. Note that the Wi-Fi communication unit 85*b* is not necessarily built in the wireless communication device 8. The Wi-Fi communication unit 85*b* may be provided outside the wireless communication device 8.

The temperature sensor 86 is a sensor that detects the temperature around the communication processor 81. The output value of the temperature sensor 86 is input to the communication processor 81 via the RAM 82 or the like. The temperature sensor 86 corresponds to a sensor that measures a chip temperature. Note that the chip here refers to a CPU, an IC, or the like that executes processing related to wireless communication. The chip temperature of the present disclosure may be the temperature of the communication processor 81 or the temperature of a chip for cellular communication.

Functions of the communication manager 87 will be described. The communication manager 87 relays and controls communication between the application 9 and the server 4. Data (so-called message) transmitted from the application 9 is input to the wireless communication device 8 through the network layer (L3), the data link layer (L2), and the physical layer (L1) as illustrated in FIG. 7. The data from the application 9 that has reached the wireless communication device 8 is wirelessly transmitted to the server 4 using a communication line designated by the communication manager 87.

Figure 8:
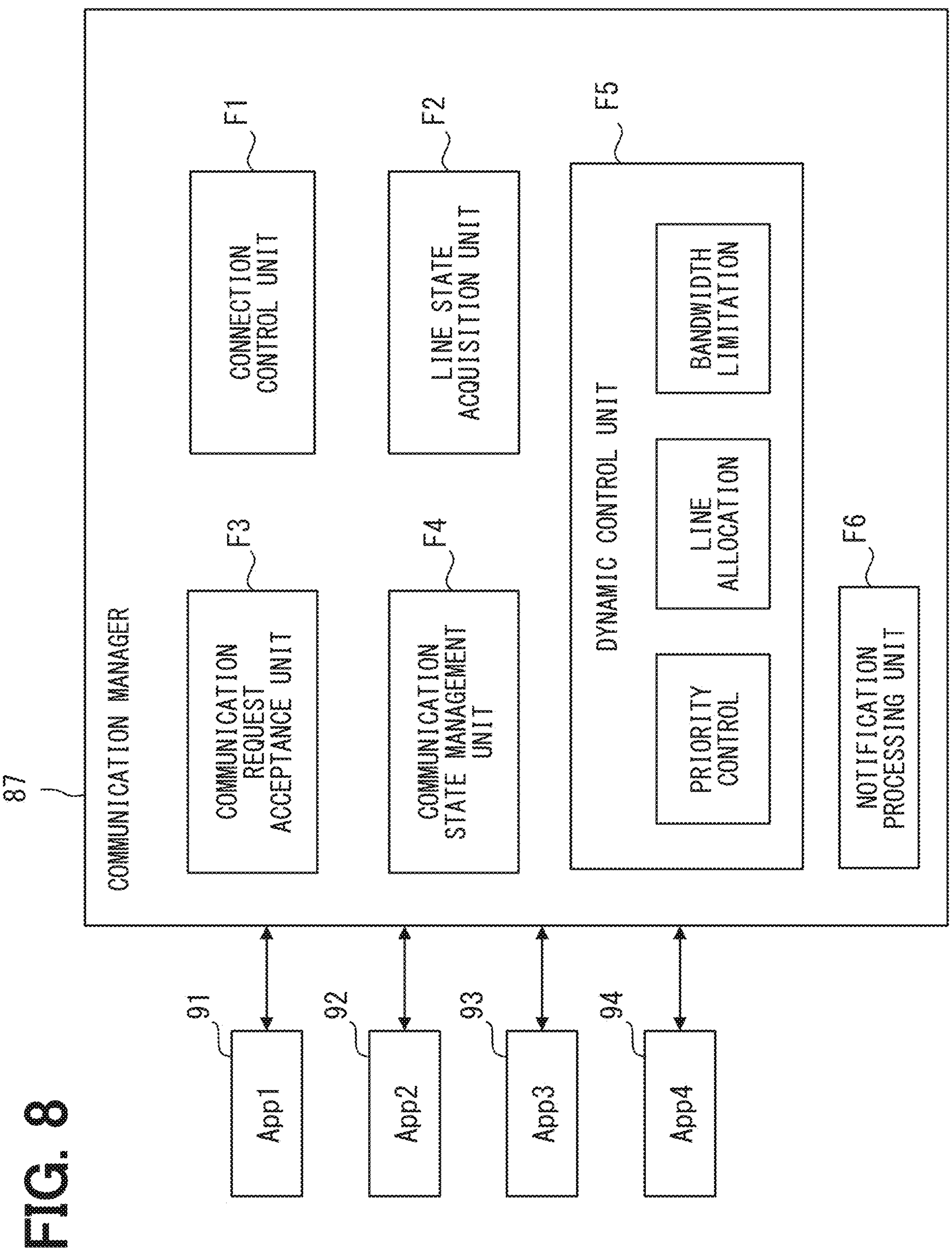
FIG. 8 is a functional block diagram of the communication manager.

As illustrated in FIG. 8, the communication manager 87 includes a connection control unit F1, a line state acquisition unit F2, a communication request acceptance unit F3, a communication state management unit F4, a dynamic control unit F5, and a notification processing unit F6 as functional blocks. The communication manager 87 corresponds to an ACP engine that is a vehicle-side functional unit constituting the ACP.

The connection control unit F1 controls the operation of the cellular communication unit 85*a*. In response to the occurrence of a predetermined connection event, the connection control unit F1 executes a procedure for establishing a communication line for each APN. The procedure for establishing a communication connection includes transmission of an attach request, transmission of APN information, and the like. As the connection event, it is possible to adopt a case where the traveling power source is turned on, a case where the cellular communication function is enabled based on a predetermined user operation on an operation member included in the vehicle Vc, and other cases.

The connection control unit F1 determines a visited cell for each cellular line and performs movement management. The connection control unit F1 acquires RSRP, RSSI, RSRQ, and the like for each cell as an index for selecting a visited cell. The "acquisition" in the present disclosure includes generation/detection by internal calculation based on data or the like input from other devices/sensors. RSRP stands for reference signal received power. RSSI stands for received signal strength indicator. RSRQ stands for reference signal received quality. The RSRP is average received power of RSs per unit resource element. The RSSI is a value obtained by measuring the power of the entire LTE system bandwidth in the OFDM symbol containing the RS. The RSRQ is the ratio of the received power of the cell-specific reference signal to the total power within the received bandwidth. The larger the RSRQ, the better the reception quality of the signal from the cellular base station 2.

Then, the connection control unit F1 performs a process for switching a visited cell as necessary based on an index such as RSRP for each cell. Information calculated by the connection control unit F1, such as RSRP and RSRQ for each cell, including a visited cell and an adjacent cell, is temporarily held in the RAM 82. The information held in the RAM 82 is updated as needed. Note that the cellular communication unit 85*a* may be equipped with a function to switch (reselect) a visited cell. Furthermore, the acquisition of the RSRP and the like may be performed by the line state acquisition unit F2.

The connection control unit F1 controls the operation of the Wi-Fi communication unit 85*b*. The connection control unit F1 starts communication connection with the Wi-Fi base station 6 based on the reception of a beacon by the Wi-Fi communication unit 85*b*. That is, a control signal for acquiring an IP address and setting security (such as exchanging an encryption key) is exchanged with the Wi-Fi base station 6.

The line state acquisition unit F2 is configured to acquire various types of information indicating the communication characteristics of each communication line. The line state acquisition unit F2 acquires a parameter related to a communication setting for each cellular line from the network-side equipment. Examples of the communication setting parameter for each cellular line include an allocated frequency, the order of priority for packet transfer, the target delay time, and the packet loss rate. The target delay time is the maximum value of the communication delay time assumed by the network-side equipment. The communication setting parameter acquired by the line state acquisition unit F2 is stored in an optional storage medium (for example, the RAM 82).

Furthermore, the line state acquisition unit F2 may sequentially evaluate the RTT and the throughput for each cellular line as state information for each cellular line and store the RTT and the throughput in the RAM 82. The RTT is the time it takes from the transmission of a signal or data to a communication partner until a response is returned, that is, the response delay time. The RTT is also referred to as round-trip latency. The throughput represents the amount of data that can be transmitted and received per unit time through a transmission path. The throughput corresponds to an index indicating a communication speed. The line state acquisition unit F2 may separately acquire the throughput in the uplink communication and the downlink communication. The line state acquisition unit F2 may acquire observed values such as RSRP and RSRQ from the connection control unit F1. The line state acquisition unit F2 may evaluate the QoS of each cellular line based on some or all of the parameters.

The communication processor 81 as the line state acquisition unit F2 determines whether congestion has occurred on each communication line. As a material for determining congestion, the packet loss rate, the delay time, or both of these can be adopted. The line state acquisition unit F2 determines that congestion has occurred when the packet loss rate is equal to or greater than a predetermined value. In addition, the line state acquisition unit F2 determines that congestion has occurred when the response delay time is equal to or greater than a predetermined value. Various methods used in TCP congestion control, such as NewReno, Vegas, Illinois, YeAH, and DCTCP, can be used as congestion detection methods. The line state acquisition unit F2 may predict the occurrence of congestion/a shortage of communication bandwidth.

Furthermore, the communication processor 81 may be configured to be able to detect congestion inside the wireless communication device 8. A state where accesses from a plurality of applications 9 are concentrated in the communication manager 87 also corresponds to a kind of congestion. The communication processor 81 can detect congestion (a high-load state) inside the wireless communication device 8, based on the degree of data retention in the communication buffer/queue. In addition, a state where the in-vehicle network Nw is congested also corresponds to a kind of congestion. In the present disclosure, congestion occurring after the wireless section is also referred to as out-of-vehicle congestion, congestion inside the wireless communication device 8 is also referred to as in-device congestion, and congestion in the in-vehicle network Nw is also referred to as in-vehicle congestion. The communication processor 81 may be configured to be able to detect not only out-of-vehicle congestion but also in-device congestion and in-vehicle congestion.

The communication request acceptance unit F3 accepts a request for data communication from inside and outside the vehicle. The communication start request from the inside of the vehicle corresponds to a communication start request from the application 9, and the communication start request from the outside of the vehicle corresponds to a communication start request from the server 4. Since the communication start request from the server 4 reaches the wireless communication device 8 via the relay server 5, the communication start request from the outside of the vehicle can be interpreted as a communication start request from the relay server 5.

Based on the reception of the communication start request from the application 9, the communication request acceptance unit F3 starts a procedure (route setting) for starting communication with the server 4 corresponding to the application 9. When notified by the relay server 5 that there is data for a certain application 9, the communication request acceptance unit F3 accepts a communication start request between the target application 9 and the server 4.

The communication request acceptance unit F3 acquires the communication condition together with/independently of the communication start request from each application 9. The communication request and the condition accepted by the communication request acceptance unit F3 are distinguished for each application 9 as a request source and temporarily stored in the RAM 82. Note that the communication condition for each application 9 can be dynamically changed over time.

The communication state management unit F4 manages the communication state of the application 9. As illustrated in FIG. 9, the communication state of each application 9 can be managed using a table that includes a plurality of items such as a priority, an execution state, the presence or absence of a limitation, a communication frequency, and a data size. The priority is a parameter indicating the order of priority related to allocation of communication lines and packet transfer. The example illustrated in FIG. 9 indicates that the second application 92 has the highest order of priority. The communication state management unit F4 dynamically sets the order of priority for each application 9 based on the urgency, control availability, acceptable RTT, acceptable waiting time, and the like indicated in the communication condition. Note that the priority for each application 9 may be a preset fixed value. Furthermore, the priority for each application 9 may be switched depending on whether the vehicle Vc is traveling. The priority for the control support application may be set lower while the vehicle is stopped than while the vehicle is traveling.

In the column for the execution state, a value is set to indicate whether the communication is active or paused. The term "active" refers to a state where data communication is currently underway. The term "paused" corresponds to a state where communication has been suspended. The term "paused" may refer to a state where the transmission and reception of data has been stopped the connection is maintained (so-called idle state). The term "paused" may refer to a state where the communication connection has been released. In the column for the bandwidth limitation, a value is input to indicate whether a limitation has been applied to the communication bandwidth of the application 9. The case where the bandwidth limitation has been applied refers to a state where the available bandwidth has been limited to a predetermined value or less. The set value (upper limit value) of the available communication bandwidth may be 0, and the state where the bandwidth limitation has been applied can include a state where communication has been substantially blocked/prohibited.

The column for the communication frequency indicates the execution frequency of communication with the server 4. The communication frequency may be determined based on an actual communication frequency within the latest predetermined time. In the column for the communication frequency, a value of the communication frequency indicated in the communication condition, in other words, a value self-reported by the application 9, may be input. The column for the data size indicates the average size of one data set (for example, a file) exchanged between the application 9 and the server 4. The data size is determined based on the size of the file transmitted and received in the past. In the column for the data size, a value of the average data size indicated in the communication condition, in other words, a value self-reported by the application 9, may be registered.

In addition, the communication state table may include a notification level. The communication state management unit F4 can also manage a notification level for each application 9. Furthermore, the communication state management unit F4 updates the value of the communication state table as needed according to the communication state of each application 9. The communication state table held by the communication state management unit F4 is referred to by the dynamic control unit F5.

The dynamic control unit F5 performs priority control, line allocation, bandwidth control, and the like. The priority control refers a process to adjust the order of transmission of transmission data (communication packet) input from the application 9, based on the priority set in the application 9. The line allocation refers to a process to determine/change a communication line to be allocated to each application 9 based on the communication condition for each application 9 and the characteristics of each communication line. Note that the elements constituting the communication route can include the size (width) of the communication bandwidth to be allocated, the allocated frequency, and the like in addition to the type of the communication line. The bandwidth control refers to a process to adjust the communication bandwidth allocated to the application 9.

The dynamic control unit F5 performs a process to limit the communication bandwidth for some or all of the applications 9 based on the communication line status and the internal state of the wireless communication device 8. When the line state acquisition unit F2 detects congestion on a certain communication line, the dynamic control unit F5 selects the application 9 to which the bandwidth limitation is applied, based on the combination of the applications 9 using the congested line, which is a line where congestion has occurred. Then, the bandwidth limitation is applied to the application 9 at a level according to the need. In addition, the dynamic control unit F5 can also apply the bandwidth limitation to the application 9 depending on the internal state of the communication manager 87 such as the chip temperature and the load status of the communication processor 81.

The notification processing unit F6 is a processing module that exchanges a message related to the communication status or the like with the application 9. The communication processor 81 as the notification processing unit F6 transmits a communication status notification to a certain application 9 when a change occurs in a communication bandwidth that can be used by the certain application 9 or when the occurrence of an event affecting the communication speed of the certain application 9 is detected.

When the dynamic control unit F5 determines to apply the bandwidth limitation to the certain application 9, the notification processing unit F6 transmits a bandwidth limitation notification to the target application. The bandwidth limitation notification is a signal indicating that the bandwidth is being limited, along with the cause therefor. Note that the bandwidth limitation is applied in one scene with the occurrence of congestion. Therefore, in one aspect, the bandwidth limitation notification corresponds to a signal indicating that the line in use by the application 9 is congested, along with the cause therefor. The bandwidth limitation notification corresponds to a message for the communication manager 87 to notify the application 9 of the congestion/bandwidth limitation of the line in use. Note that the notification processing unit F6 may transmit the bandwidth limitation notification to the application 9 using a certain line at a time point before the dynamic control unit F5 actually applies the bandwidth limitation to the certain application 9 and at the timing when the line state acquisition unit F2 detects congestion on the certain communication line.

When a certain communication line becomes temporarily unavailable due to interference or movement out of the communication range, the notification processing unit F6 transmits a line disconnection notification to the application 9 using the communication line. The line disconnection notification is a signal indicating that the line in use has become unavailable, along with the cause therefor. Instead of the line disconnection notification, the communication processor 81 may transmit the bandwidth limitation notification to the application 9 in which the communication line is in a blocked (disconnected) state as a result of the bandwidth limitation process.

Moreover, as a preferable mode, when there is a communication line in which the communication speed (communication throughput) is equal to or less than a predetermined value due to an increase in chip temperature or the like, the notification processing unit F6 of the present embodiment can transmit a speed decrease notification to the application 9 using the line. The speed decrease notification corresponds to a signal indicating the low-speed state and the cause therefor. Instead of the speed decrease notification, the communication processor 81 may transmit the bandwidth limitation notification to the application 9 in which the communication is in a low-speed state as a result of the bandwidth limitation process.

Each of the bandwidth limitation notification, the line disconnection notification, and the speed decrease notification described above corresponds to a type of communication status notification. The bandwidth limitation notification, the line disconnection notification, and the speed decrease notification have the same frame configurations. Naturally, as another mode, the bandwidth limitation notification, the line disconnection notification, and the speed decrease notification may have different frame configurations. The description of the communication status notification in the following description can be appropriately replaced with the bandwidth limitation notification, the line disconnection notification, or the speed decrease notification.

Figures 10, 11:
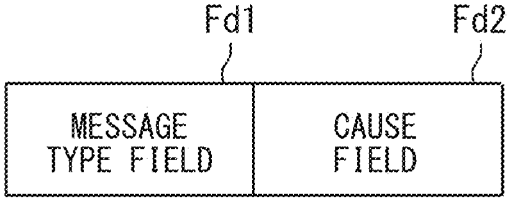
FIG. 10 is a diagram illustrating an example of a configuration of a bandwidth limitation notification.
FIG. 11 is a diagram illustrating examples of causes for limitation.

The content/configuration of the communication status notification can vary depending on the notification level of the notification target application 9. For example, the bandwidth limitation notification transmitted to the application 9 with its notification level set to 1 includes a message type field Fd1 and a cause field Fd2 as illustrated in FIG. 10.

The message type field Fd1 indicates which notification the message corresponds to (that is, the message type): the bandwidth limitation notification, the line disconnection notification, or the speed decrease notification. When the message type is the bandwidth limitation notification, in the message type field Fd1, a predetermined code is placed to indicate that congestion has occurred on the line in use/the bandwidth is limited.

The cause field Fd2 is an area in which a code is placed to indicate the cause for the bandwidth limitation, the line blocking, or the speed decrease (hereinafter, bandwidth limitation or the like). As illustrated in FIG. 11, the causes for the bandwidth limitation or the like include "lower priority", "traffic surge", "environmental degradation", "increase in chip temperature", "line disconnection", "critical service in operation", "3G line in use", "interference avoidance", "high-load state", and "contract upper limit reached".

In one aspect, these causes can each be referred to as a limitation cause that is the cause for the bandwidth limitation. Furthermore, some of the following causes can also be referred to as a disconnection cause that is the cause for line disconnection or a speed decrease cause that is the cause for a decrease in communication speed. A cause code that is a code indicating a cause is allocated to each cause. The value of the cause code illustrated in FIG. 11 is an example and can be changed as appropriate.

Note that the "lower priority" corresponds to a case where a communication bandwidth available to a certain application 9 is limited (reduced) as a result of contention with the traffic of another application 9 having a higher priority. The notification processing unit F6 transmits a bandwidth limitation notification, in which a bit string indicating a lower priority is placed in the cause field Fd2, to the application 9 to which the bandwidth limitation is applied due to the lower priority.

The "traffic surge" corresponds to a case where the volume of communication data increases and congestion occurs. For example, a traffic surge can occur when the exchange of large capacity and important data is started. The "traffic surge" can be applied to a case where fluctuations in the radio wave environment or the bandwidth itself allocated from the network-side equipment to the communication manager 87 are relatively small. The notification processing unit F6 transmits a bandwidth limitation notification, in which a bit string indicating a traffic surge is placed in the cause field Fd2, to the application 9 to which the bandwidth limitation is applied due to the traffic surge.

The "environmental degradation" corresponds to a case where the communication environment deteriorates and congestion occurs. The notification processing unit F6 transmits a bandwidth limitation notification, in which a bit string indicating environmental degradation is placed in the cause field Fd2, to the application 9 to which the bandwidth limitation is applied due to the environmental degradation. Note that the bandwidth limitation due to the environmental degradation can be applied when the amount of increase in the traffic relayed by the communication manager 87 is less than a predetermined value. That is, in a case where congestion has occurred/is expected as a result of a reduction in available wireless resources although the traffic volume handled by the communication manager 87 has not changed, the communication processor 81 can apply the bandwidth limitation on an application-by-application basis due to the environmental degradation.

The "increase in chip temperature" corresponds to a case where the communication throughput is suppressed because the temperature of the communication processor 81 has increased. The communication processor 81 determines whether the chip temperature is equal to or higher than a predetermined value based on the output of the temperature sensor 86. The communication processor 81 can transition the communication speed/processing speed to a low-speed state when the chip temperature is equal to or higher than a predetermined value. The low-speed state refers to a state where the speed is equal to or less than a predetermined value. For example, the low-speed state may be a state where the communication speed/processing speed is 10% or less of the maximum value/average value. The notification processing unit F6 transmits a speed decrease notification/bandwidth limitation notification, in which a bit string indicating an increase in chip temperature is placed in the cause field Fd2, to the application 9 that is using a line in which the speed decreases accompanying the increase in chip temperature.

The "line disconnection" corresponds to a case where the cellular line is disconnected for some cause or a case where the mobile device is out of the range of the Wi-Fi access point while the Wi-Fi line is in use". The notification processing unit F6 transmits a line disconnection notification, in which a bit string indicating line disconnection is placed in the cause field Fd2, to the application 9 using the disconnected line.

The "critical service in operation" corresponds to a case where a critical service related to human life, such as an emergency call service or an automatic driving service, is in operation, and as a result, a communication bandwidth is insufficient. The notification processing unit F6 transmits a bandwidth limitation notification, in which a bit string indicating the critical service in operation is placed in the cause field Fd2, to the application 9 to which the bandwidth limitation is applied due to the operation of the critical service. In other embodiments, lower priority may be integrated while the critical service is in operation.

The "3G line in use" corresponds to a state where the communication manager 87 is out of the LTE/4G range and the throughput decreases. The "Interference avoidance" corresponds to a case where output limitation for suppressing radio wave interference is being executed. The communication processor 81 can determine the presence or absence of an interference radio wave based on a noise level or the like observed by the wireless communication unit 85. The "high-load state" corresponds to a case where the communication processor 81 is in the high-load state. The communication processor 81 transmits a bandwidth limitation notification, in which a bit string indicating a high-load state is placed in the cause field Fd2, to the application 9 to which the bandwidth limitation is applied due to the high-load state. The "contract upper limit reached" corresponds to a case where the volume of communication data has reached/exceeded the contract's upper limit value.

Figures 12, 13:
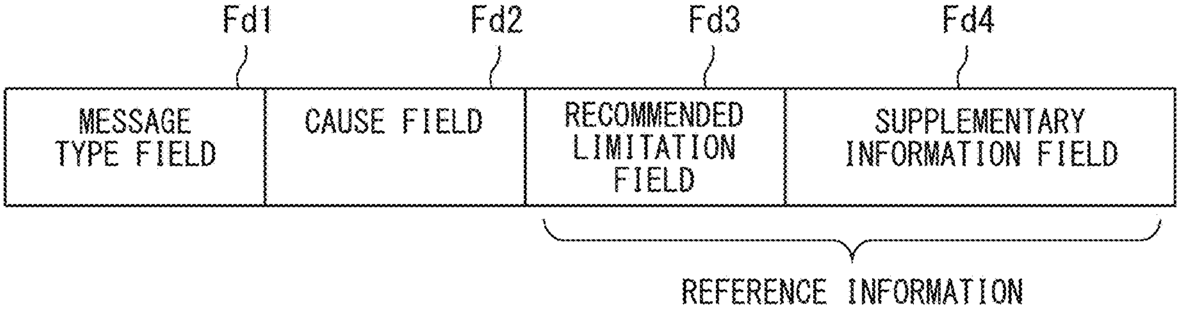
FIG. 12 is a diagram illustrating another configuration example of the bandwidth limitation notification.
FIG. 13 is a diagram illustrating examples of recommended control.

Furthermore, as illustrated in FIG. 12, the bandwidth limitation notification transmitted to the application with its notification level set to 2 or 3 includes a recommended control field Fd3 and a supplementary information field Fd4 in addition to the message type field Fd1 and the cause field Fd2. The recommended control field Fd3 is an area indicating recommended control content. The recommended control content indicates a response policy to be taken by the application 9 for bandwidth limitation or the like. The transmission of the bandwidth limitation notification indicating the recommended control content corresponds to a recommendation/suggestion/instruction to execute the control for the notification destination application 9.

The supplementary information field Fd4 is an area in which information related to recommended control content is stored. The bit length of the supplementary information field Fd4 may be dynamically adjustable. The recommended control content and the supplementary information correspond to reference information.

As illustrated in FIG. 13, variations of recommended control content include "fixed time wait", "wait for resume instruction", "timing shift", "retry interval dynamic control", "line switch", and "non-use of cellular line". A recommended control code that is a unique code is allocated to each recommended control content. The value of the recommended control code illustrated in FIG. 13 is an example and can be changed as appropriate.

The "fixed time wait" means waiting for data transmission/reception for a fixed time. The "wait for resume instruction" means that communication is paused until a resume permission notification indicating that data communication with the server 4 may be resumed is received from the communication manager 87. In the case of the fixed time wait, the application 9 can perform communication after a predetermined time without receiving a resume permission notification from the communication manager 87. When it is difficult to predict the time until the cause for the speed decrease/blocking, such as congestion, is resolved, the communication manager 87 can select a wait for resume instruction as the recommended control instead of a fixed time wait.

The "timing shift" means to shift data transmission timing. Note that the fixed time wait also corresponds to a type of timing shift. The difference is that in the fixed time wait, the wait time is a fixed value or a value indicated by the communication manager 87, whereas in the timing shift, the application 9 itself determines the transmission timing based on supplementary data provided from the communication manager 87. The timing shift corresponds to control content that is more difficult/flexible to control on the application 9 side than the fixed time wait.

The "retry interval dynamic control" means that the retry interval in TCP or the like is dynamically adjusted from a default value according to the traveling status of the vehicle Vc. The retry interval may also be referred to as a retransmission time. The retry interval dynamic control refers to control that sets the retry interval to 60 seconds or the like while the vehicle is stopped, and sets to a value at which a change in the radio wave environment can be expected, such as 5 seconds or 10 seconds, while the vehicle is traveling. The retry interval dynamic control may be to stop retries when the vehicle is stopped, and to increase the retry interval by a predetermined amount above the default value when the vehicle is traveling. The amount of increase in the retry interval may be a constant value such as 3 seconds or 10 seconds, or may be dynamically determined by the communication manager 87 according to the line status. The default value of the retry interval is a value applied when no bandwidth limitation is applied, and can differ for each application 9.

The "line switch" means that the line in use is switched to a communication line different from the current line. When the target application is currently using the first line, the line switch corresponds to switching the line in use from the first line to the second line or the Wi-Fi line. The "non-use of cellular line" means to avoid using the cellular line as much as possible.

The selection of the recommended control according to the cause for the bandwidth limitation or the like may be performed by the notification processing unit F6 or may be performed by the dynamic control unit F5. The arrangement of functions in the communication manager 87 can be changed as appropriate.

Meanwhile, the notification processing unit F6 of the present embodiment changes the fineness/amount of reference information included in the communication status notification depending on whether the notification level is 2 or 3. FIG. 14 is a diagram illustrating examples of combinations of recommended control content and supplementary information when the notification level of the control target application is set to 2. FIG. 15 is a view illustrating examples of combinations of recommended control content and supplementary information when the notification level of the control target application is set to 3.

In a case where a fixed time wait is proposed as recommended control to the application 9 with its notification level set to 2, the notification processing unit F6 transmits a communication status notification, in which data indicating the wait time or the time at which communication may be resumed is stored in the supplementary information field Fd4. In addition, in a case where a wait for resume instruction is proposed as recommended control to the application 9 with its notification level set to 2, the notification processing unit F6 transmits a communication status notification in which the predicted time for permitting the communication resume, the resume condition, and the like are stored in the supplementary information field Fd4.

More specifically, in a case where a wait for resume instruction caused by environmental degradation is proposed, the notification processing unit F6 may transmit a communication status notification to which the predicted time until the bandwidth limitation can be released is added as supplementary information. The predicted time until the bandwidth limitation can be released may be calculated based on the radio wave map and the travel plan of the host vehicle. In a case where a wait for resume instruction caused by an increase in chip temperature is proposed, the notification processing unit F6 transmits a communication status notification to which the current chip temperature, resumption-possible chip temperature, and the like are added as supplementary information. In a case where non-use of cellular line is proposed as recommended control to the application 9 with its notification level set to 2, the notification processing unit F6 transmits a communication status notification in which data indicating the predicted time until the connection to Wi-Fi becomes available is stored in the supplementary information field Fd4.

In a case where a timing shift is proposed as recommended control to the application 9 with its notification level set to 3, the notification processing unit F6 transmits a communication status notification in which traffic prediction data is stored in the supplementary information field Fd4. The traffic prediction data is data indicating a predicted transition of the traffic volume within a predetermined time in the future. The traffic prediction data corresponds to data indicating the communication timing at which the risk of collision with another application 9 is low. The traffic prediction data can be generated based on the communication frequency, average data size, final communication time, and the like indicated in the communication condition for each application 9 currently communicating.

In a case where retry interval dynamic control is proposed to the application 9 with its notification level set to 3, the notification processing unit F6 transmits a communication status notification in which the current status data regarding the communication state is stored in the supplementary information field Fd4. The current status data related to the communication state may be estimated values of the current communication traffic and communication throughput. Also, in a case where a wait for resume instruction derived from the increase in chip temperature is proposed to the application 9 with its notification level set to 3, the notification processing unit F6 transmits a communication status notification in which the current status data related to the communication state is stored in the supplementary information field Fd4.

In a case where a line switch caused by line disconnection is proposed to the application 9 with its notification level set to 3, the notification processing unit F6 transmits a communication status notification in which the available line information is stored in the supplementary information field Fd4. The available line information indicates a communication line available at the present time. In a case where a line switch caused by line disconnection is proposed, notification processing unit F6 may transmit the radio wave map or the communication status notification in which the predicted time until the communication line is recovered is added as supplementary information.

In a case where a line switch caused during the operation of the critical service is proposed to the application 9 with its notification level set to 3, the notification processing unit F6 transmits a communication status notification in which operating service information is stored in the supplementary information field Fd4. The operating service information indicates the type of the critical service in operation. The operating service information may include an estimated value of the remaining time until the communication related to the service is completed. In a case where a line switch caused by line disconnection or a critical service in operation is proposed, the notification processing unit F6 may transmit a communication status notification to which available line information or a radio wave map is added as supplementary information.

In a case where a wait for resume instruction caused by a 3G line in use is proposed to the application 9 with its notification level set to 3, the notification processing unit F6 transmits a communication status notification in which the radio wave map is stored in the supplementary information field Fd4. In a case where a wait for resume instruction caused by a 3G line in use is proposed, the notification processing unit F6 may transmit a communication status notification to which the predicted 4G return time is added as supplementary information. The predicted 4G return time can be calculated based on the 4G area information included in the radio wave map, the current position and moving speed of the host vehicle, and the like. The 4G area information is information indicating an area in which 4G is available.

In a case where a wait for resume instruction caused by a high-load state is proposed to the application 9 with its notification level set to 3, the notification processing unit F6 transmits a communication status notification in which the load status data is stored in the supplementary information field Fd4. The load status data is data indicating the processing load of the communication processor 81. The processing load can be expressed by, for example, the usage rate of the CPU or the memory, the number of processes, the traffic volume staying in the buffer, and the like. In a case where a wait for resume instruction caused by a high-load state is proposed, the notification processing unit F6 may transmit a communication status notification to which the predicted time until the processing load becomes less than a predetermined value is added as supplementary information. The predicted time until the processing load becomes less than the predetermined value can be calculated from the processing speed (processing throughput) within the latest predetermined time and the current processing load amount.

Note that the specific content of the recommended control proposed to the application 9 can be changed as appropriate according to the cause for limitation. The type of information to be notified as supplementary information can be changed as appropriate. In addition, the communication status notification for the application 9 having a notification level of 1 may also include the recommended control field Fd3 and the supplementary information field Fd4 as the frame configuration. In this case, a predetermined code indicating that there is no recommended control content can be inserted into the recommended control field Fd3 and the supplementary information field Fd4. As described above, the configuration of the communication status notification may be common regardless of the notification level.

Figure 16:
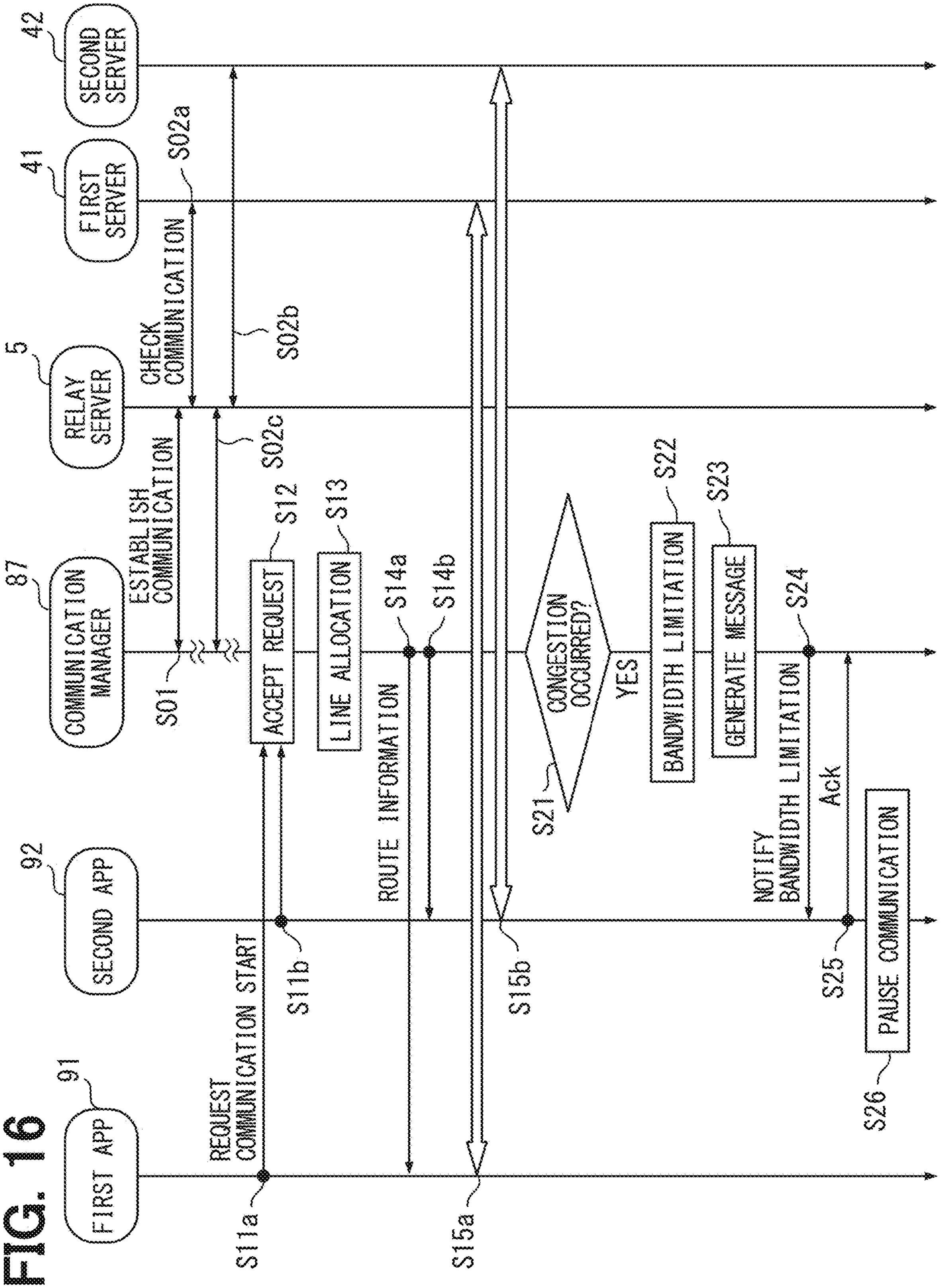
FIG. 16 is a sequence diagram for explaining the operation of the communication manager.
Figure 17:
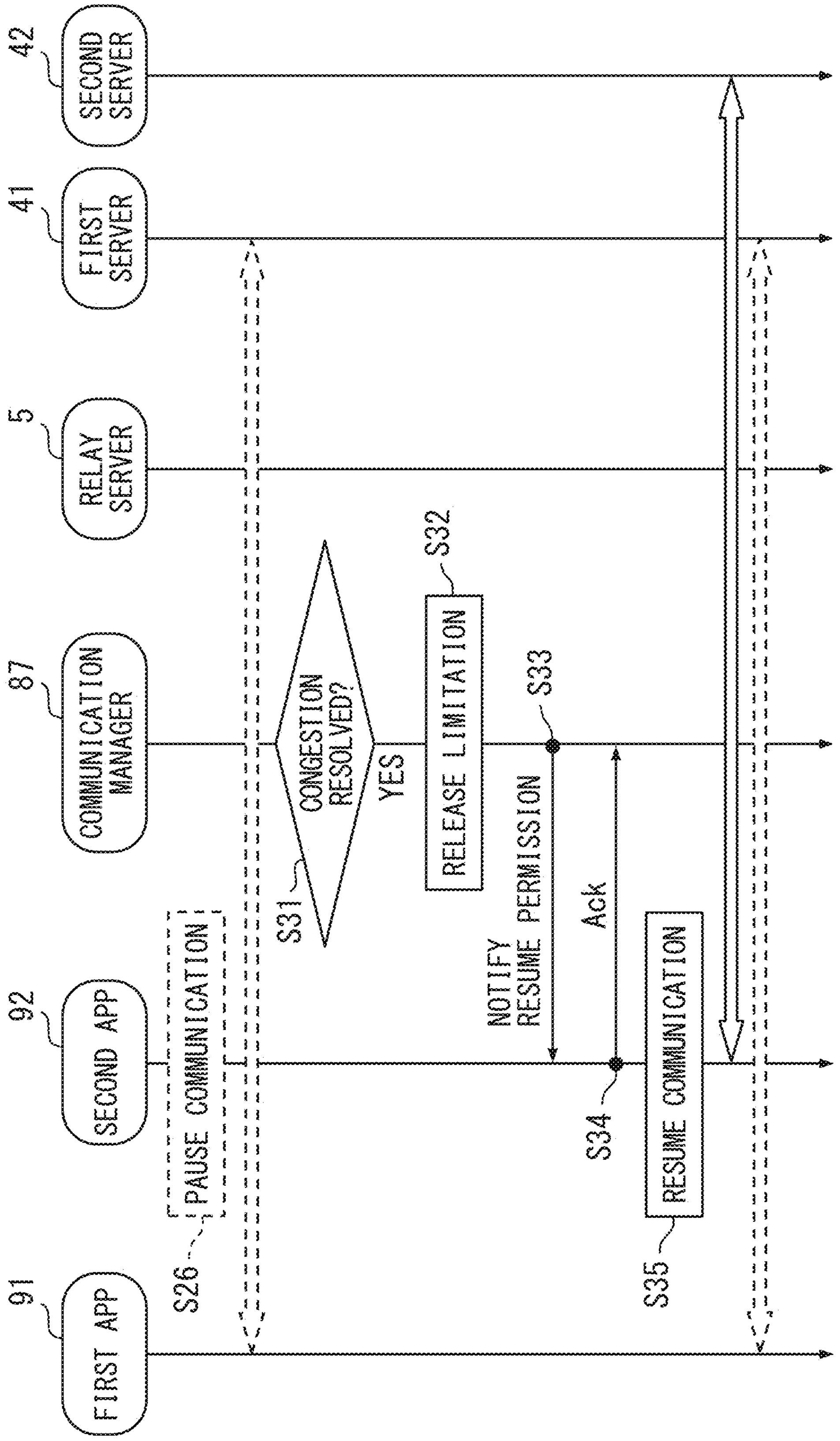
FIG. 17 is a sequence diagram for explaining the operation of the communication manager.

The process flow of the entire system, i.e., the interaction among the application 9, the communication manager 87, the relay server 5, and the server 4 will be described with reference to sequence diagrams illustrated in FIGS. 16 and 17. The first application 91 and the second application 92 illustrated in FIGS. 16 and 17 may each be an optional application. In the following description, the first application 91 is an application with a higher priority than the second application 92. A first server 41 illustrated in FIGS. 16 and 17 is the server 4 corresponding to the first application 91, and a second server 42 is the server 4 corresponding to the second application 92. FIG. 17 illustrates a subsequent sequence of the sequence illustrated in FIG. 16. The communication manager 87 as the process execution subject in the descriptions of FIGS. 16 and 17 can be read as the wireless communication device 8 or the communication processor 81.

First, the communication manager 87 establishes a communication line for each APN at the timing when a predetermined connection event occurs (step S01). That is, the communication manager 87 ensures a communication route with the relay server 5 prior to a communication start request from the application 9. In a state where the communication connection between the communication manager 87 and the relay server 5 is established, the communication manager 87 and the relay server 5 perform a communication check by transmitting and receiving predetermined control signals at predetermined timings as appropriate (step S02*c*). The relay server 5 and the server 4 also perform a communication check by transmitting and receiving predetermined control signals at regular time intervals (Steps S02*a*, S02*b*). In parallel with the process flow illustrated in FIG. 16, the communication manager 87 executes handover or the like accompanying the movement of the vehicle Vc. In addition, in parallel with the process flow illustrated in FIG. 16, the communication manager 87 repeatedly connects and disconnects communication with the Wi-Fi base station 6 accompanying the movement of the vehicle Vc.

Thereafter, when transmission data is generated in the first application 91, the first application 91 outputs a communication start request to the communication manager 87 (step S11*a*). Similarly, the second application 92 outputs a communication start request to the communication manager 87 as needed (step S11*b*). The communication start request output from the application 9 to the communication manager 87 includes the application ID, the communication condition, the notification condition, and the like as described above. Note that the communication condition and the like may be acquired in advance by the communication manager 87 communicating with the application 9.

Upon receiving the communication start request from the application 9, the communication manager 87 accepts the request (step S12). Specifically, the application ID and the communication condition are temporarily stored in association with each other in a predetermined storage area. Although only one step corresponding to a request acceptance process is illustrated in FIG. 16 for convenience, the request acceptance process is performed for each communication start request, that is, for each application 9.

The communication manager 87 allocates a communication line satisfying the notified communication condition to the application 9 of the request source based on the communication start request, and performs a route setting process (step S13). The route setting process includes, for example, ensuring a port for the application 9. A source IP address, a source port number, a destination IP address, a destination port number, a protocol, and the like are determined by the route setting process. Note that the source port is allocated to each application 9. There is one application 9 corresponding to one port number. The communication manager 87 may allocate a plurality of source port numbers to one application. Naturally, instead of the communication manager 87, the application 9 itself may ensure the source port, in other words, acquire the port number.

In the present embodiment, candidates of the cellular line that accommodates the data communication of the application 9 include the first line and the second line. When the vehicle Vc is present within the communication range of the Wi-Fi base station 6 available to the vehicle Vc, the Wi-Fi line can also be included as an option for the communication route that can be adopted. Here, assuming that there is a sufficient communication bandwidth in the first line, the communication manager 87 allocates the first line to both the first application 91 and the second application 92.

When the setting of the communication route to the server 4 is completed, the communication manager 87 transmits route information to the server 4 corresponding to each of the first application 91 and the second application 92 (Steps S14*a*, S14*b*). The notification of the communication route information can correspond to a communication permission response that is a message for permitting the start of communication.

Upon receiving the route information from the communication manager 87, the application 9 starts encrypted communication with the server 4 using the port number and the destination address indicated in the route information (Steps S15*a*, S15*b*). For example, the application 9 and the server 4 perform TLS communication.

As described above, communication between the application 9 and the server 4 is performed via the relay server 5. The communication manager 87 notifies not only the application 9 but also the relay server 5 of the application ID of the communication request source in association with the port number. The communication manager 87 and the relay server 5 identify traffic based on the source port uniquely allocated to each application 9 and perform communication control. The relay server 5 performs a process to transfer encrypted data using the port number notified from the communication manager 87. Note that the communication manager 87 and the relay server 5 may perform the transfer process by using a plurality of items included in the 5-tuple information in combination. The information used by the relay server 5/communication manager 87 to specify the transmission source and the transfer destination of communication traffic can be changed as appropriate.

Thereafter, in a state where the first application 91 and the second application 92 are using the first line, when the communication manager 87 detects congestion on the first line (YES in step S21), the degrees of priority for the first application 91 and the second application 92 are compared, and the application 9 to which a bandwidth limitation is applied is selected. Here, as an example, the communication manager 87 determines to apply the bandwidth limitation to the second application 92 with a relatively low priority. Then, the communication manager 87 applies the bandwidth limitation to the second application 92 (step S22). The bandwidth limitation here may be a process corresponding to communication blocking for completely stopping communication, or may allow communication to continue at a speed equal to or less than a predetermined value. Depending on the line status, the communication manager 87 can apply the bandwidth limitation not only to the second application 92 but also to the first application 91.

With/prior to the start of the bandwidth limitation, the communication manager 87 generates a bandwidth limitation notification according to the cause for the bandwidth limitation (step S23) and transmits the bandwidth limitation notification to the second application 92 (step S24). For example, the communication manager 87 transmits a bandwidth limitation notification indicating that the bandwidth limitation is applied due to lower priority or traffic surge. When the notification level of the second application 92 is set to 2 or 3, the communication manager 87 may transmit a message including recommended control content and supplementary information. The communication manager 87 may transmit a bandwidth limitation notification recommending a wait for resume instruction/fixed time wait.

In response to the reception of the bandwidth limitation notification from the communication manager 87, the second application 92 transmits a response message (so-called Ack) indicating the acceptance of the start of the bandwidth limitation (step S25). Then, for example, data communication with the server 4 is paused based on the cause/recommended control content/supplementary information, and the like indicated in the received bandwidth limitation notification (step S26). Note that the communication pause is an example of a recovery process for the bandwidth limitation notification, and a process such as a line switch may be separately executed. The recovery process refers to a process that is temporarily performed for the bandwidth limitation or the like. Communication pause, a line switch, a change in communication timing, and the like correspond to a recovery process. In addition, the recovery process can also include a process to reduce the traffic volume, which is not normally performed, such as a change in file compression system or a thinning (careful selection) process for transmission data. Moreover, in addition to the communication-related processes, a process to notify another application 9/ECU 7/user of the service stop and quality deterioration also corresponds to an example of the recovery process. The recovery process corresponds to response control to bandwidth limitation/communication trouble. Note that data communication between the first application 91 and the server 4 can be continued.

Thereafter, as illustrated in FIG. 17, when the communication manager 87 detects that the congestion on the first line has been resolved (step S31 YES), the bandwidth limitation for the second application 92 is released (step S32). Then, the communication manager 87 transmits a resume permission notification to the second application 92 (step S33). The resume permission notification corresponds to a type of message indicating that the bandwidth limitation has been released. The second application 92 returns Ack based on the reception of the resume permission notification (step S34) and resumes the communication using the first line (step S35).

Figure 18:
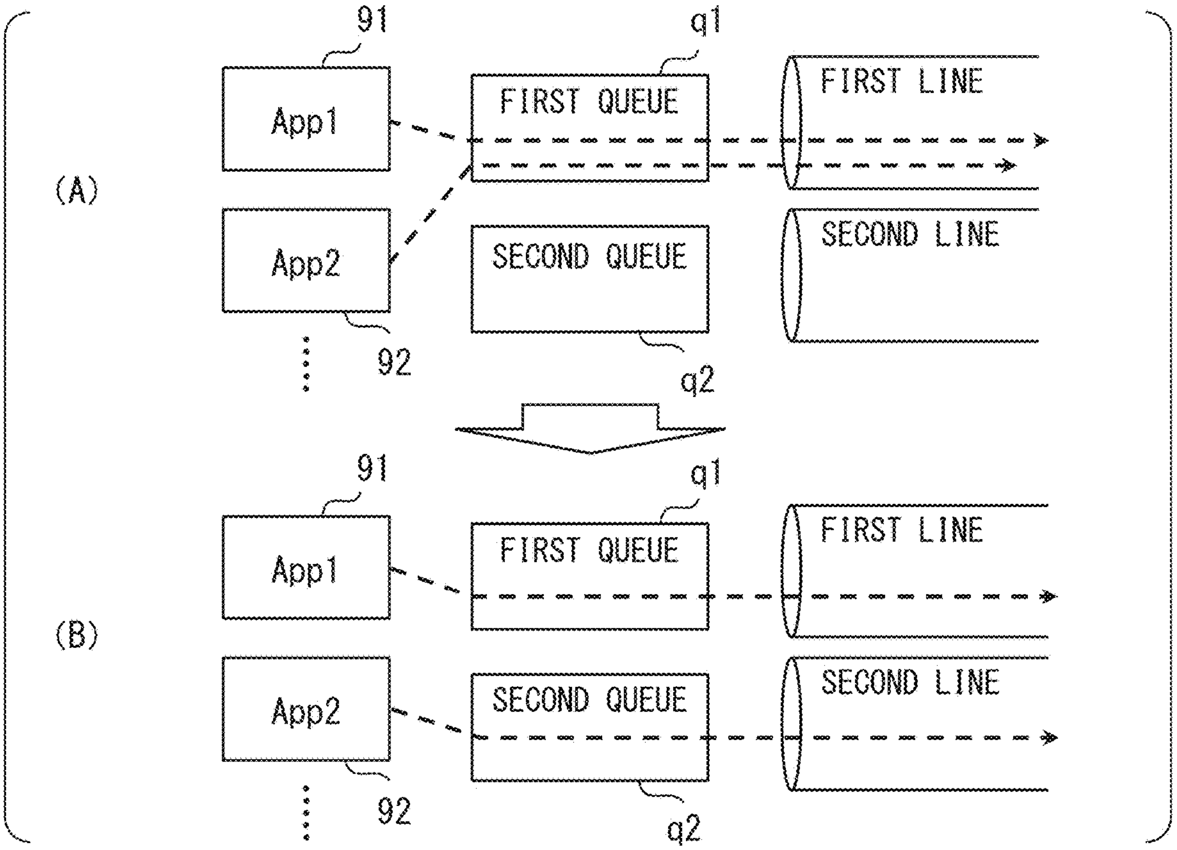
FIG. 18 is a diagram illustrating a case where communication lines of some applications are switched due to congestion.

Additional information about the response policy at occurrence of congestion will be described. In FIGS. 16 and 17, as a measure against congestion on the first line, the mode in which the communication manager 87 causes the second application 92 to pause communication has been described, but the present invention is not limited thereto. In response to congestion on the first line, the communication manager 87 may switch the line in use by the second application 92 to the second line as illustrated in FIG. 18. The communication line to be changed may be the Wi-Fi line instead of the second line. Moreover, the communication line may be switched mainly by the second application 92 instead of the communication manager 87. Note that a first queue q1 illustrated in FIG. 18 is a queue for data to be transmitted on the first line, and a second queue q2 is a queue for data to be transmitted on the second line.

Figure 19:
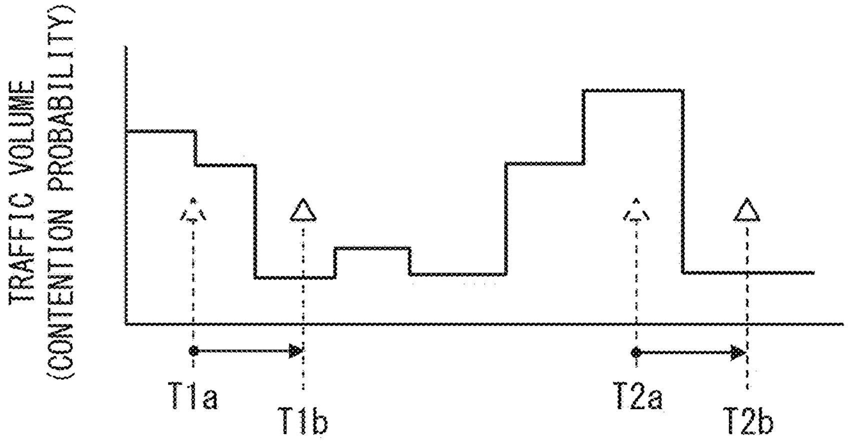
FIG. 19 is a diagram illustrating a case where communication timings of some applications are adjusted due to congestion.

For the congestion on the first line, the communication manager 87 may suggest a timing shift to the second application 92. The communication manager 87 may transmit a bandwidth limitation notification, including traffic prediction data as supplementary information, to the second application 92. As illustrated in FIG. 19, the traffic prediction data is data indicating the transition of traffic volume within a predetermined time in the future, in other words, the transition of contention probability. The contention probability can be calculated based on the ratio of the transmitted traffic volume to the communication bandwidth available to the wireless communication device 8. In the drawing, T1*a* and T2*a* indicate originally scheduled communication timings, and T1*b* and T2*b* indicate changed communication timings.

The second application 92 can determine the timing at which the contention probability is low based on the traffic prediction data provided from the communication manager 87, and perform data communication on the changed schedule. As described above, the communication manager 87 may indirectly control the communication timing for the application 9 by providing supplementary information.

Figure 20:
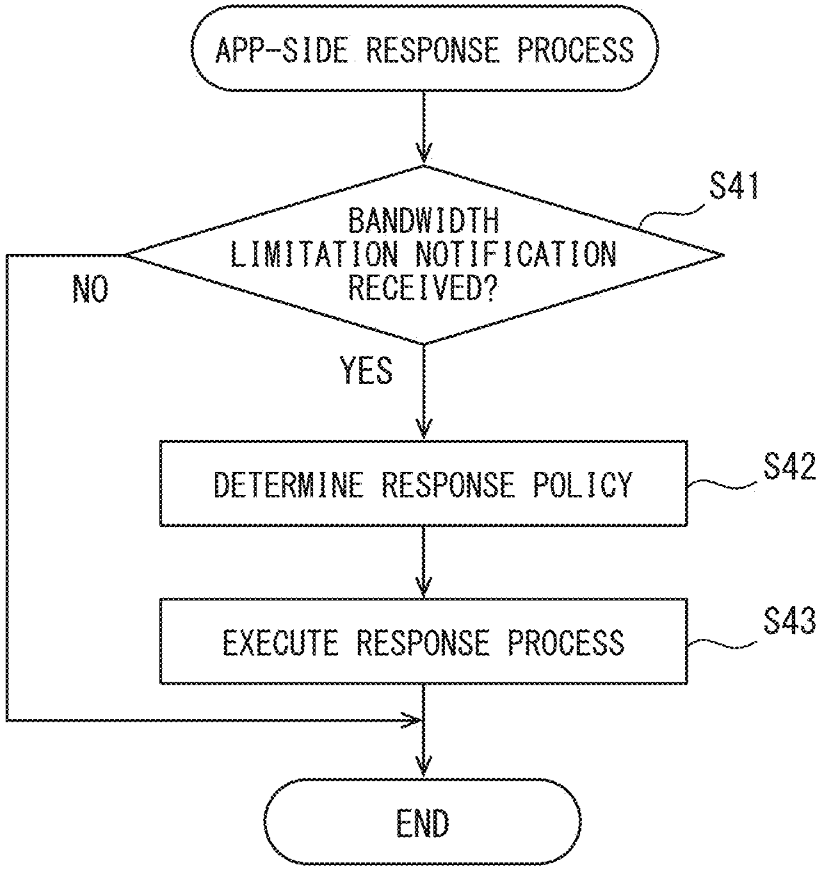
FIG. 20 is a flowchart for explaining an operation of an application in response to a bandwidth limitation notification.

Additional information about the application's response to bandwidth limitation notification will be described. As illustrated in FIG. 20, upon receiving a bandwidth limitation notification (step S41 YES), the application 9 determines a response policy, in other words, the content of the recovery process, based on the cause indicated in the notification (step S42). If recommended control content is included in the bandwidth limitation notification, determining the response policy includes determining whether to execute the recommended control, that is, whether to follow a proposal from the communication manager 87. How to respond to a bandwidth limitation notification is programmed in advance for each application 9. When executing control for reducing communication, the application 9 returns Ack to the communication manager 87 and starts the determined control (step S43). On the other hand, when determining not to execute control for reducing communication, the application 9 can transmit Nack back to the communication manager 87 as a negative response to the bandwidth limitation notification.

When a line switch has been proposed as the recommended control, the application 9 can output a request for switching to an available line such as the second line or the Wi-Fi line to the communication manager 87. That is, the application 9 can switch the line in use in cooperation with the communication manager 87. When a timing shift has been proposed as the recommended control, the application 9 determines the communication timing based on the traffic prediction data and executes communication at the timing. In addition, when determining to pause communication as a response policy to the bandwidth limitation, the application 9 waits for a resume permission notification from the communication manager 87.

Additional information about the transmission mode of the bandwidth limitation notification will be described. Although the mode in which a bandwidth limitation notification is transmitted to the second application 92 at the timing when it is determined to apply the bandwidth limitation has been described above, the transmission timing for the bandwidth limitation notification is not limited thereto. The communication manager 87 can transmit a bandwidth limitation notification according to the notification condition for each application 9. For example, when the notification condition for the second application 92 has been defined as a case where the bandwidth limitation is expected within 10 seconds, the bandwidth limitation notification can be transmitted at the timing when the condition is satisfied. The bandwidth limitation notification in this case can also be referred to as a bandwidth limitation notice.

When the notification condition for the second application 92 has been defined as a case where the bandwidth limitation continues for 5 seconds or more, the communication manager 87 can issue the bandwidth limitation notification to the second application 92 when the duration of the bandwidth limitation is expected to be 5 seconds or more. In the case of the above setting, when the bandwidth limitation is expected to be released within 5 seconds, the communication manager 87 can omit the transmission of the bandwidth limitation notification.

When the notification condition for the second application 92 has been defined as a case where severe congestion occurs, the communication manager 87 can issue the bandwidth limitation notification to the second application 92 only when severe congestion occurs. In the case of the above setting, when the congestion level is mild, the communication manager 87 can omit the transmission of the bandwidth limitation notification. The communication manager 87 transmits not only the bandwidth limitation notification but also the line disconnection notification and the like at the timing according to the notification condition.

Figure 21:
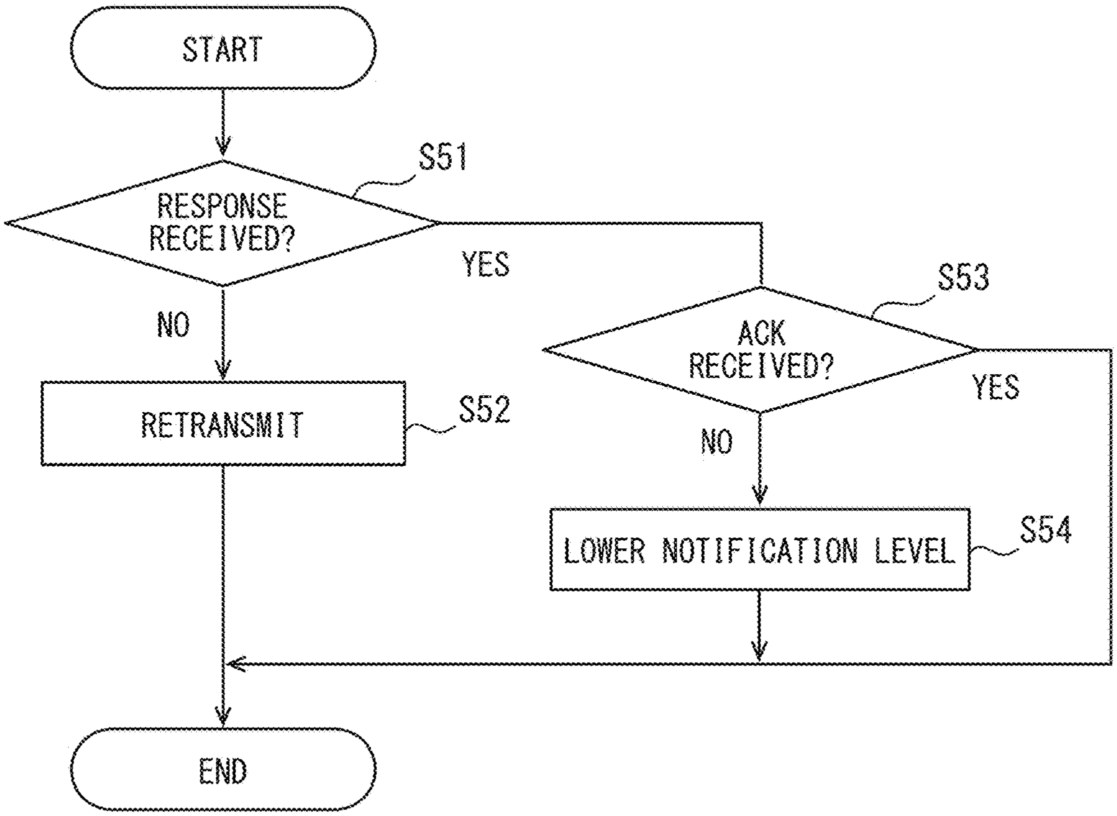
FIG. 21 is a diagram for explaining the operation of the communication manager after the transmission of the bandwidth limitation notification.

The reaction of the communication manager 87 to the application's response will be described. As illustrated in FIG. 21, when no response is obtained from the notification destination application 9 after a predetermined time has elapsed since the transmission of the bandwidth limitation notification (step S51: NO), the communication manager 87 may retransmit the bandwidth limitation notification (step S52). In addition, when the response to the bandwidth limitation notification received from the application 9 is not Ack (NO in step S53), the notification level for the application 9 may be lowered by one level (step S54). The case where Ack cannot be received includes a case where a negative response such as Nack is received.

Note that step S52 may be a process to lower the notification level. When Ack from the application 9 cannot be obtained after the bandwidth limitation notification is transmitted a predetermined number of times, the communication manager 87 may lower the notification level of the application. Lowering the notification level enables omission of a process such as generation of supplementary information for the application 9 that does not follow the proposal from the communication manager 87. As a result, the processing load on the communication manager 87 can be reduced. The communication manager 87 may be configured to be able to set level 0 at which the transmission of the bandwidth limitation notification is stopped as the notification level of the application 9. The notification level, which has been changed based on the reception status of the response to the bandwidth limitation notification or the like, may be reset as the traveling original power is turned on and off.

Additional information about line allocation will be described. At the time of line allocation to the application 9, the communication manager 87 checks the status of each communication line. The status here can include the size of the communication bandwidth allocated from the network-side equipment, the free space, the allocated frequency, and the like. The status of each communication line can also include a throughput, an RTT, and the like of each communication line that are sequentially evaluated by the line state acquisition unit F2. Naturally, the status information of the cellular line can include the order of priority for packet transfer notified from the network-side equipment, the target delay time, the packet loss rate, and the like. RSRP, RSSI, RSRQ, and the like for each visited cell can also be used as the status of the cellular line. Whether the Wi-Fi line is available is also included in the status of the Wi-Fi line. In the present disclosure, such a process (step) as described above for checking the current status of each communication line is also referred to as a line status checking process.

Based on the status of each line acquired by the line status checking process, the communication manager 87 selects the communication line to be allocated to the application 9 as the communication request source. The communication line allocated to the application 9 is a communication line satisfying the communication condition notified from the application 9 or a communication line expected to satisfy the communication condition. The communication manager 87 selects a line satisfying the communication condition including an acceptable RTT, a minimum bandwidth, an average size, and the like, among a plurality of lines as an allocated line.

Here, advantages of the proposed configuration, which is the configuration described above, will be described by introducing a comparative configuration. The comparative configuration is a configuration in which the communication manager 87 provides no notification to the target application 9 when the bandwidth limitation is applied to the application 9. As in the comparative configuration, when the communication manager 87 does not notify the application 9 that the bandwidth limitation has been applied, the cause why no response is returned from the server 4 is unknown on the application 9 side. Here, the application 9 side refers to the main body of the application 9 and the TCP layer located below the main body.

Figure 22:
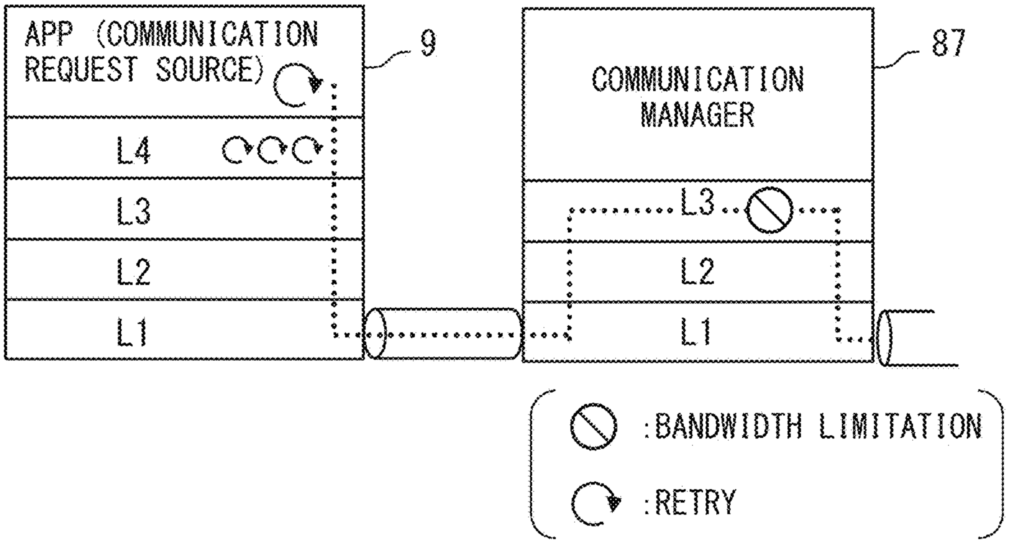
FIG. 22 is a diagram for explaining a problem with a comparative configuration.

Therefore, as illustrated in FIG. 22, TCP retry can be repeated at predetermined intervals on the application 9 side. In addition, the application 9 itself can also perform the retransmission process until a timeout occurs. That is, when the communication manager 87 does not notify the target application that the bandwidth limitation has been applied, it is difficult to immediately recognize that communication with the server 4 is not possible, and the state of waiting for a response from the server 4 can continue. In other words, the influence propagation of the bandwidth limitation takes time. In addition, as a result of the application 9 or the application-side TCP performing the retry many times, the processing load of the communication manager 87 increases, and the execution throughput can further decrease.

To deal with such a problem, according to the proposed configuration, when the communication manager 87 applies the bandwidth limitation to a certain application 9, a bandwidth limitation notification is promptly transmitted. With this configuration, the application 9 can recognize that communication with the server 4 is difficult/impossible without waiting for a timeout or the like. In turn, it is possible to quickly execute appropriate response control (recovery process) based on the fact that communication with the server 4 is difficult/impossible. In addition, an effect of preventing repetition of futile retries by the application 9 side can also be expected.

Moreover, the communication manager 87 of the proposed configuration notifies the application 9 of not only the fact that the bandwidth limitation has been applied, but also the cause for the limitation. With this configuration, the application 9 can recognize the cause why the response from the server 4 is not returned. As a result, the application 9 can select an appropriate response according to the cause for limitation, such as a line switch or a timing shift.

In addition, the communication manager 87 notifies the application 9 of the cause for the limitation, in other words, the recommended control content according to the communication status/internal state. With this configuration, the application 9 can easily perform the recovery process according to the communication status/internal state. In particular, the communication manager 87 in the proposed configuration also provides the application 9 with supplementary information for enabling finer control in accordance with the recommended control content. With this configuration, the application 9 can perform the recovery process according to the situation/characteristics of the application 9.

Although the effects of the case where the communication processor 81 as the communication manager 87 transmits the bandwidth limitation notification to the related application 9 at the time of execution of the bandwidth limitation/occurrence of congestion have been described above, similar effects can be obtained in a case where a line disconnection notification or a speed decrease notification is transmitted.

In addition, in the embodiment described above, the content to be notified to the application 9 is changed according to the notification level for each application 9. This configuration corresponds to a configuration in which uniform information is not distributed to all the applications 9 but information according to a request for each application 9 is provided. With this configuration, the application 9 can execute a more appropriate recovery process. It is possible to provide information necessary and sufficient for the application 9 to perform the recovery process. Note that a change in notification content according to the notification level may be an optional element and may be omitted.

In the embodiment described above, the timing for transmitting the communication status notification to each application 9 is changed according to the notification condition for each application 9. With this configuration, the communication status can be understood at the timing that meets a request for each application 9. Accordingly, the application 9 can execute a more appropriate recovery process. Note that the adjustment of the notification timing according to the notification condition for each application 9 is an optional element and may be omitted.

While the embodiment of the present disclosure has been described above, the present disclosure is not limited to the embodiment described above. Various modifications to be described below are also included in the technical scope of the present disclosure. Besides the modifications to be described below, the present disclosure can be implemented with various changes without departing from the gist of the present disclosure. Supplements and modifications described below can be appropriately combined and implemented within a range in which no technical contradiction occurs. Components having the same or equivalent functions as those of the above-described components are assigned the same reference symbols, and descriptions thereof may be omitted. Further, when only a part of a configuration is mentioned, the above description can be applied to the other parts of the configuration.

Figure 23:
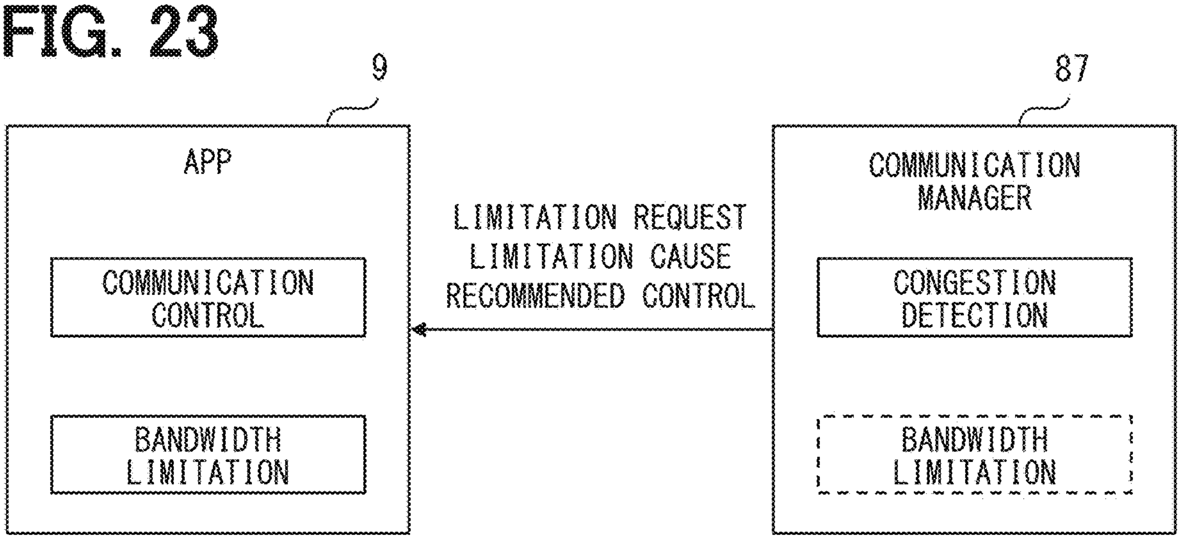
FIG. 23 is a diagram illustrating a configuration example in which an application has a bandwidth limitation function.

For example, in the embodiment described above, the configuration in which only the communication manager 87 has the bandwidth limitation function, in other words, the configuration in which the communication manager 87 centrally controls the communication traffic of each application 9 has been described, but the present invention is not limited thereto. As illustrated in FIG. 23, the application 9 may also have a bandwidth limitation function. The bandwidth limitation function may be distributed and disposed in both the communication manager 87 and the application 9.

Figure 24:
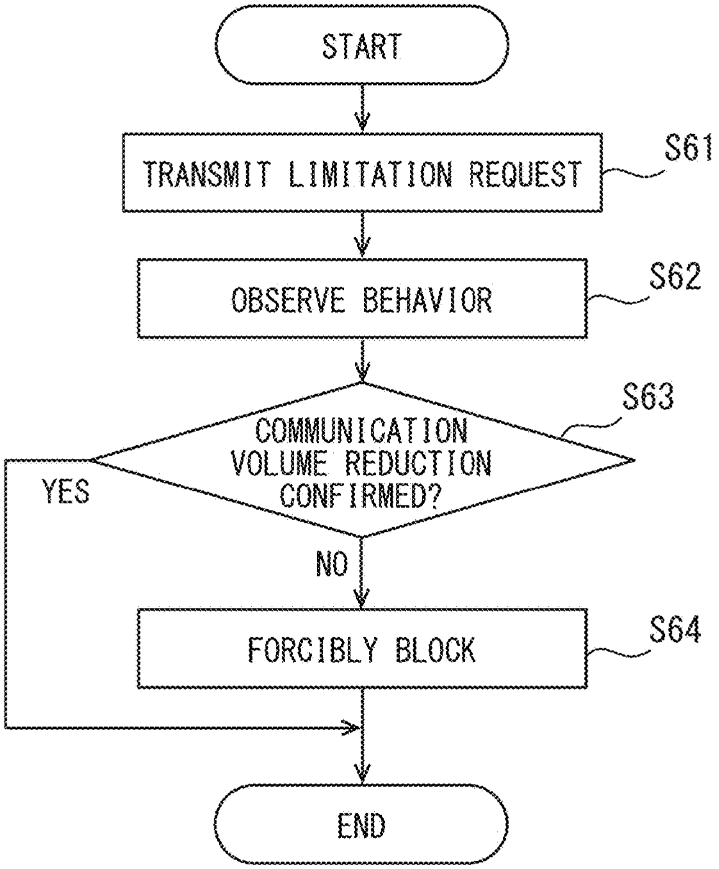
FIG. 24 is a flowchart for explaining the operation of the communication manager when an application has a bandwidth limitation function.

When the application 9 has the bandwidth limitation function, the communication manager 87 detects congestion as needed, and transmits a bandwidth limitation request to some or all of the applications 9 based on the detection of the occurrence of congestion (step S61 in FIG. 24). The bandwidth limitation request corresponds to a message notifying the occurrence of congestion. The bandwidth limitation request may include an upper limit value of the communication volume per predetermined time or a reduction target value of the traffic volume. The application 9 performs bandwidth control in accordance with the bandwidth limitation request from the communication manager 87. The communication manager 87 monitors the subsequent communication volume/behavior of the application 9 that has transmitted the bandwidth limitation request (step S62), and determines whether the communication volume has been reduced (step S63). Then, the communication manager 87 applies the bandwidth limitation to application 9, where a reduction in communication volume could not be confirmed (step S64).

As described above, the communication manager 87 may forcibly applies the bandwidth limitation to the application 9 that does not follow the bandwidth limitation request. With this configuration, the processing load of the communication manager 87 can be reduced, and a decrease in throughput due to an increase in chip temperature or the like can be suppressed.

In addition, detecting congestion in the wireless section by the communication manager 87 is an optional element and is not an essential element. The communication manager 87 may be configured not to detect congestion but to detect the occurrence of at least one event other than congestion and notify the application 9 of the occurrence of the detected event. Examples of the event other than congestion that affects communication between the application 9 and the server 4 include an increase in chip temperature, a high-load state, line disconnection, the occurrence of interference, and the contract upper limit reached. The communication manager 87 may be configured to notify the application 9 of only the fact of the communication status, such as a decrease in congestion/communication speed or line blocking, without applying the bandwidth limitation based on congestion detection.

The present disclosure also includes the following configurations.

Configuration 1

A communication control device comprising a communication controller configures to carry out controlling data communication between an application operating in a vehicle and an external device present outside the vehicle, wherein the controlling includes:

- detecting disconnection of a communication line by monitoring a state of at least one communication line available to the communication controller; and
- transmitting a line disconnection notification to the application that has used the communication line disconnected based on the detecting the disconnection of the communication line, the line disconnection notification indicating that the communication line in use has become unavailable.

With the above configuration, when the communication line is disconnected, the application can recognize disconnection without waiting for a communication timeout (that is, promptly). Accordingly, it is possible to expect effects such as preventing execution of useless retries on the application side and reducing the processing load of the application/communication control device. Note that the disconnection of the communication line corresponds to the disconnection of a communication connection. Examples of the case where the communication line is disconnected include movement out of the communication range, a system malfunction, and deterioration of a radio wave environment. Out of the communication range can include an underground parking lot and a tunnel in addition to a suburb such as deep in the mountain.

Configuration 2

A communication control device comprising a communication controller configured to carry out controlling data communication between an application operating in a vehicle and an external device present outside the vehicle, wherein the controlling includes:

- acquiring a communication speed in at least one communication line available to the communication controller, and
- transmitting, based on detecting that the communication speed is equal to or lower than a predetermined value, a notification indicating that a communication line in use is in a low-speed state to the application using the communication line with the communication speed equal to or lower than the predetermined value.

With the above configuration, the application can quickly recognize that the communication speed of the line in use is equal to or lower than the predetermined value for some cause. In turn, it is possible to expect effects such as preventing execution of useless retries by the application and reducing the processing load of the application/communication control device.

The communication controller, system, and methods thereof described in the present disclosure may be realized by a dedicated computer constituting a processor programmed to execute one or more functions embodied by a computer program. Furthermore, the communication controller and the method thereof described in the present disclosure may be realized by using a dedicated hardware logic circuit. Moreover, the communication controller and the method thereof described in the present disclosure may be realized by one or more dedicated computers configured by a combination of a processor that executes a computer program and one or more hardware logic circuits. Some or all of the functions of the communication processor 81 may be realized as hardware. A mode in which a certain function is realized as hardware includes a mode in which the function is realized using one or more ICs or the like. As the processor (arithmetic core), a CPU, a microprocessor unit (MPU), a graphics processing unit (GPU), a data flow processor (DFP), or the like can be adopted. Some or all of the functions of the communication processor 81 may be realized by combining a plurality of types of arithmetic processing devices. Some or all of the functions of the communication processor 81 may be realized by using a system-on-chip (SoC), an FPGA, an ASIC, or the like. FPGA stands for Field-Programmable Gate Array. ASIC stands for Application Specific Integrated Circuit. In addition, the computer program may be stored in a non-transitory tangible storage medium, which is computer-readable, as instructions to be executed by a computer. As a storage medium for the program, a hard disk drive (HDD), a solid-state drive (SSD), a flash memory, or the like can be adopted.

What is claimed is:

1. A communication control device comprising a communication controller configured to carry out controlling communication between a subject device and an external device, the communication being performed via a second network by an application executed by the subject device connected to a first network different from the second network, wherein the controlling includes detecting occurrence of congestion on a communication line used for the communication by monitoring a state of the communication line, transmitting, based on the detecting the occurrence of congestion, a notification to the application that has used the communication line on which the occurrence of congestion has been detected, the notification indicating congestion on the communication line in use, acquiring a communication speed of the communication line, and transmitting, based on detecting the communication line with the communication speed equal to or lower than a predetermined value, a speed decrease notification to the application that has used the communication line with the communication speed equal to or lower than the predetermined value, the speed decrease notification indicating that the communication line is in a low-speed state.

2. The communication control device according to claim 1, wherein the notification is a signal indicating the congestion on the communication line in use and a cause for the congestion.

3. The communication control device according to claim 1, wherein the controlling further includes applying a bandwidth limitation to the application based on the detecting the occurrence of congestion on the communication line, and the transmitting the notification includes outputting the notification to the application to which the bandwidth limitation is applied.

4. The communication control device according to claim 3, wherein the notification is a signal indicating a limitation applied to a communication speed of the application and a cause for the limitation.

5. The communication control device according to claim 3, wherein the controlling further includes transmitting reference information to the application to which the bandwidth limitation has been applied, the reference information being information for the application determining response control to the bandwidth limitation.

6. The communication control device according to claim 5, wherein the reference information is at least one of content of control recommended by the communication controller for the application to execute, a predicted time until a cause for the bandwidth limitation is resolved, predictive data on a traffic volume for each duration in a data flow through the communication line, information on the communication line available at a time of the outputting of the notification, a radio wave map indicating communication quality for each location, or next communicable timing.

7. The communication control device according to claim 5, wherein the controlling further includes acquiring a notification level from the application, the notification level indicating fineness or an amount of the reference information that the application requests to be notified of, and the transmitting the reference information includes providing the application to which the bandwidth limitation has been applied with the reference information that corresponds to the notification level designated by the application.

8. The communication control device according to claim 1, wherein the controlling further includes acquiring a notification condition from the application, the notification condition being a condition under which the application requests the notification to be transmitted, and the transmitting the notification includes transmitting the notification to the application based on satisfying the notification condition.

9. The communication control device according to claim 1, wherein the controlling further includes outputting, based on the detecting of the occurrence of congestion on the communication line, a bandwidth limitation request to the application, the bandwidth limitation request requesting the application to limit a communication volume per predetermined time to a predetermined value or less.

10. The communication control device according to claim 9, wherein the controlling further includes determining whether the application that has received the bandwidth limitation request complies with the bandwidth limitation request, and applying a bandwidth limitation to the application based on determining that the application fails to comply with the bandwidth limitation request.

11. The communication control device according to claim 1, wherein the controlling further includes transmitting, based on detecting disconnection of the communication line, a line disconnection notification to the application that has used the communication line being disconnected, the line disconnection notification indicating that the communication line in use has become unavailable.

12. The communication control device according to claim 3, wherein the application is one of applications executed by at least one or more devices connected to the first network, and the outputting the notification is performed without outputting the notification to an application to which no bandwidth limitation is applied among the applications.

13. A communication control method performed by a communication control device for controlling communication between a subject device and an external device, the communication being performed via a second network by an application executed by the subject device connected to a first network different from the second network, the communication control method comprising:

detecting occurrence of congestion on a communication line used for the communication by monitoring a state of the communication line;

transmitting, based on the detecting the occurrence of congestion, a notification to the application that has used the communication line on which the occurrence of congestion has been detected, the notification indicating congestion on the communication line in use;

acquiring a communication speed of the communication line; and transmitting, based on detecting the communication line with the communication speed equal to or lower than a predetermined value, a speed decrease notification to the application that has used the communication line with the communication speed equal to or lower than the predetermined value, the speed decrease notification indicating that the communication line is in a low-speed state.

14. A non-transitory computer readable medium storing an application control program that includes instructions for a subject device executing an application for performing data communication with an external device, the instructions being configured to, when executed by at least one processor, cause the subject device to carry out:

receiving a message from a communication control device configured to control communication between the application and the external device, the message indicating that congestion has occurred on a communication line used for the communication with the application; and limiting the communication based on the receiving of the message indicating that congestion has occurred on the communication line;

wherein the communication control device is configured to control communication between the application and the external device by:

detecting occurrence of congestion on the communication line used for the communication by monitoring a state of the communication line;

transmitting, based on the detecting the occurrence of congestion, the message to the application that has used the communication line on which the occurrence of congestion has been detected;

acquiring a communication speed of the communication line; and transmitting, based on detecting the communication line with the communication speed equal to or lower than a predetermined value, a speed decrease notification to the application that has used the communication line with the communication speed equal to or lower than the predetermined value, the speed decrease notification indicating that the communication line is in a low-speed state.

* * * * *